(12) United States Patent
Ono et al.

(10) Patent No.: US 11,447,090 B2
(45) Date of Patent: Sep. 20, 2022

(54) KNEE PROTECTION AIRBAG DEVICE

(71) Applicant: TOYODA GOSEI CO., LTD., Kiyosu (JP)

(72) Inventors: Minoru Ono, Kiyosu (JP); Tetsuya Ogata, Kiyosu (JP); Naoki Hotta, Kiyosu (JP); Yuta Okayama, Kiyosu (JP); Yoshihiko Hishiki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/202,698

(22) Filed: Mar. 16, 2021

(65) Prior Publication Data

US 2021/0300288 A1    Sep. 30, 2021

(30) Foreign Application Priority Data

Mar. 27, 2020   (JP) .............................. JP2020-058915
Sep. 29, 2020   (JP) .............................. JP2020-163772

(51) Int. Cl.
| | |
|---|---|
| *B60R 21/206* | (2011.01) |
| *B60R 21/2165* | (2011.01) |
| *B60R 21/231* | (2011.01) |
| *B60R 21/215* | (2011.01) |
| *B60R 21/217* | (2011.01) |
| *B60R 21/201* | (2011.01) |
| *B60R 21/207* | (2006.01) |

(52) U.S. Cl.
CPC ........ *B60R 21/2165* (2013.01); *B60R 21/201* (2013.01); *B60R 21/206* (2013.01); *B60R 21/207* (2013.01); *B60R 21/2176* (2013.01); *B60R 21/231* (2013.01); *B60R 2021/23169* (2013.01)

(58) Field of Classification Search
CPC . B60R 21/206; B60R 21/2165; B60R 21/231; B60R 21/215; B60R 21/217; B60R 21/2176; B60R 21/201; B60R 21/205; B60R 2021/23169
USPC ........................ 280/728.2, 728.3, 730.1, 732
See application file for complete search history.

(56) References Cited

U.S. PATENT DOCUMENTS

| | | | |
|---|---|---|---|
| 2015/0108741 A1 | 4/2015 | Ostman et al. | |
| 2019/0176742 A1 | 6/2019 | Svensson et al. | |

FOREIGN PATENT DOCUMENTS

| | | | | |
|---|---|---|---|---|
| DE | 202014006709 U1 | * 11/2014 | ........... | B60R 21/217 |
| JP | 2015-81082 A | 4/2015 | | |
| JP | 2018-47788 A | 3/2018 | | |

(Continued)

*Primary Examiner* — Keith J Frisby
(74) *Attorney, Agent, or Firm* — Posz Law Group, PLC

(57) ABSTRACT

A knee protection airbag device is provided with an airbag, an inflator, an airbag cover, and an attachment base to be connected to a vehicle body side member. The airbag cover includes a door portion that allows forming of a protrusion-permitting opening when pushed by the airbag that inflates, a door disposition wall portion that covers a lower portion of the airbag in a folded state, and connecting wall portions that extend upward from front and rear edges of the door disposition wall portion and that are connected to the attachment base. The airbag cover defines an accommodating recess capable of accommodating the airbag that is formed by bending a portion of the recessed grooves for bending that are formed by performing press working on a sheet member made of a non-woven fabric.

15 Claims, 29 Drawing Sheets

(56) References Cited

FOREIGN PATENT DOCUMENTS

| JP | 2019-523172 A |   | 8/2019 |
|----|---------------|---|--------|
| JP | 2020040505 A  | * | 3/2020 |

* cited by examiner

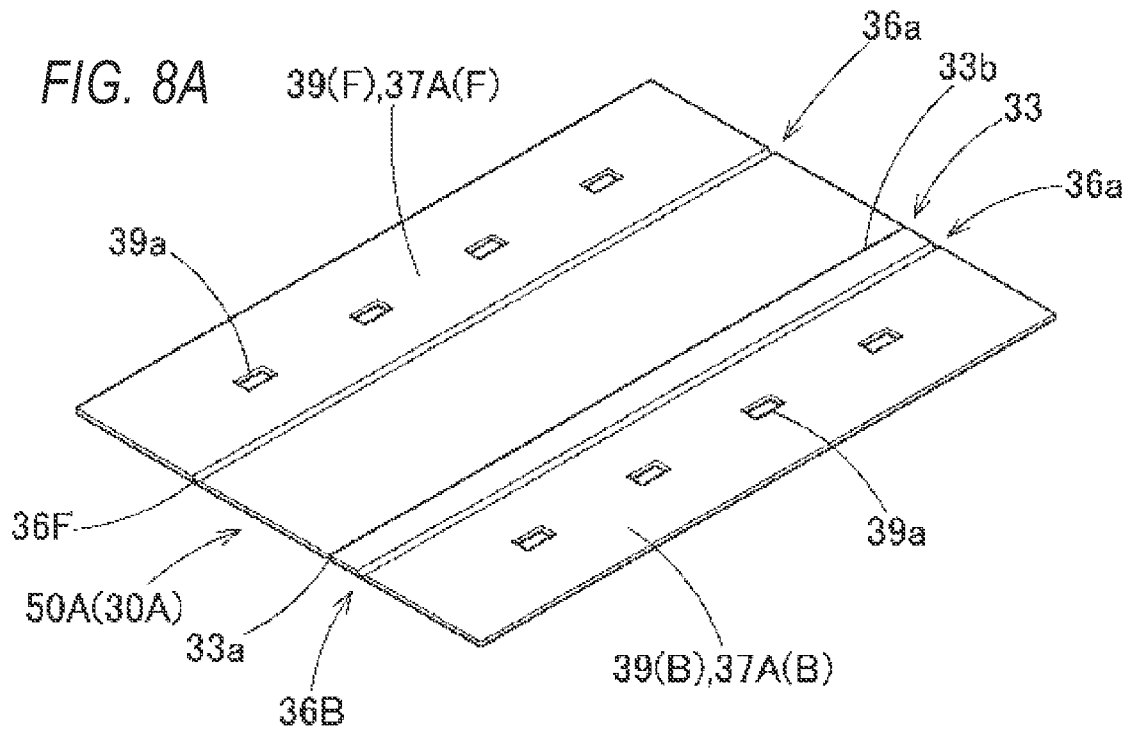
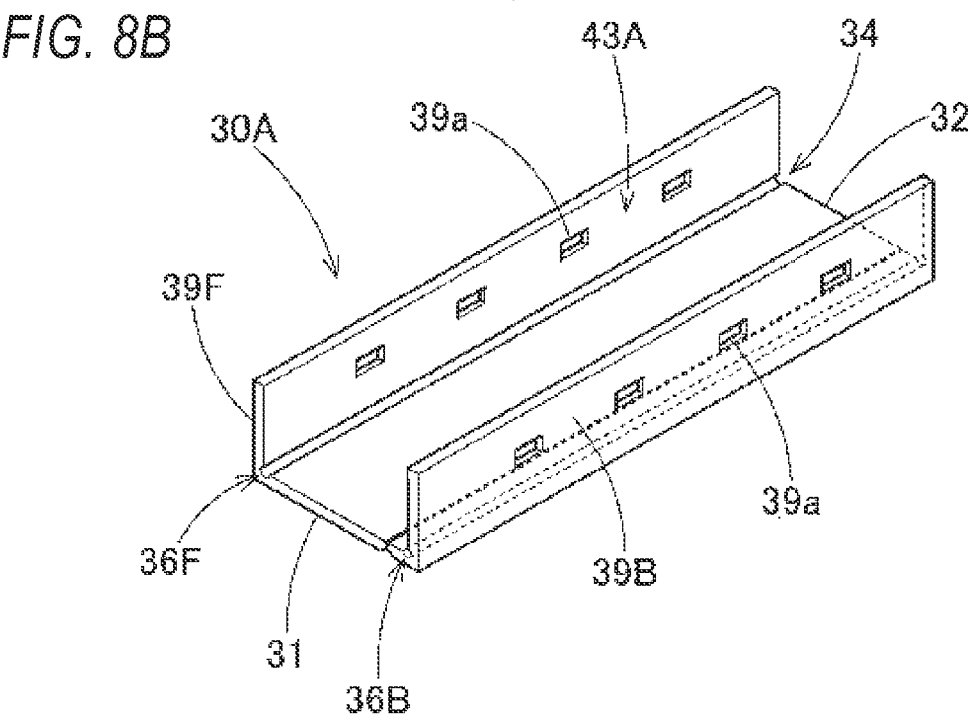

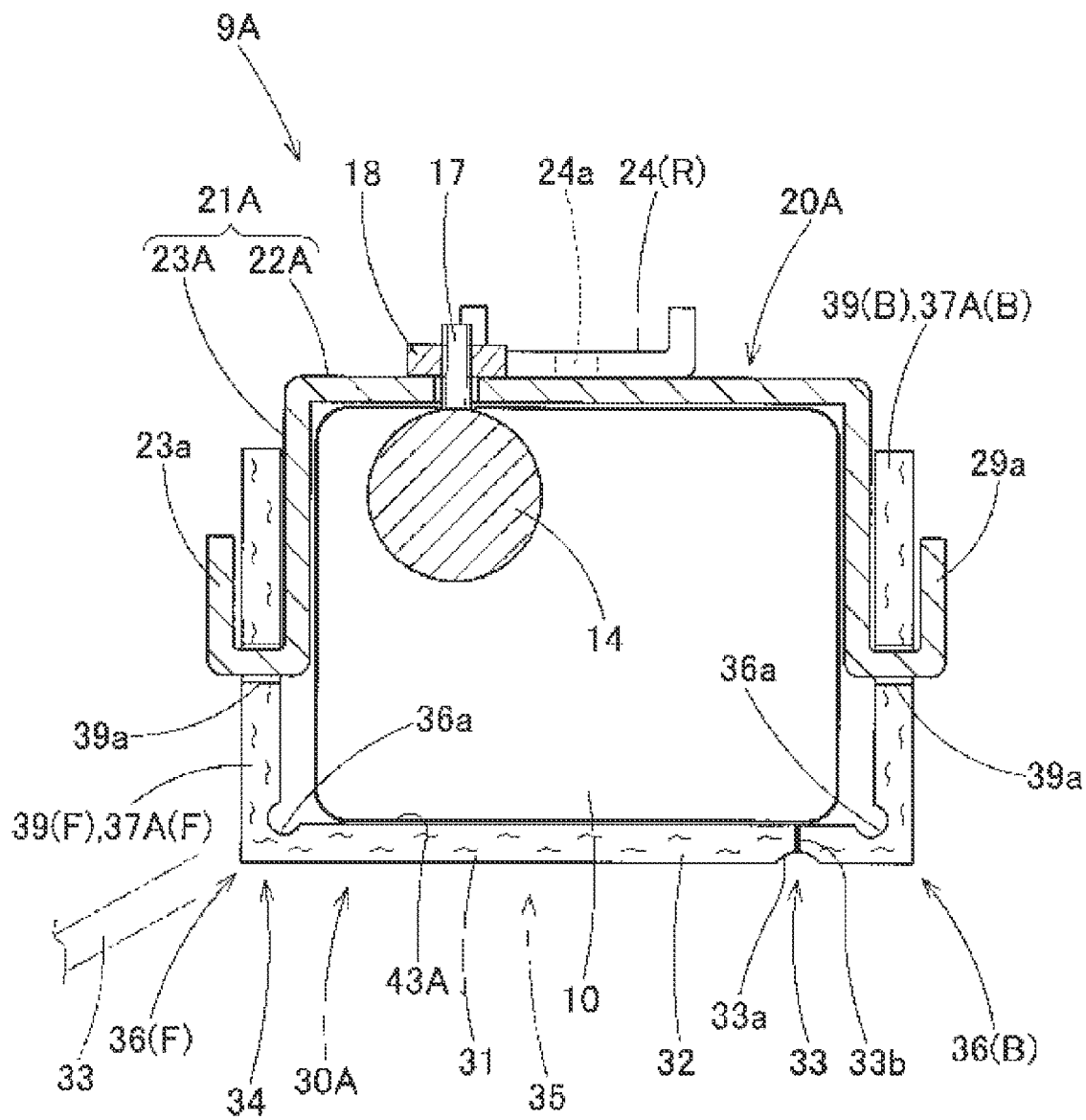

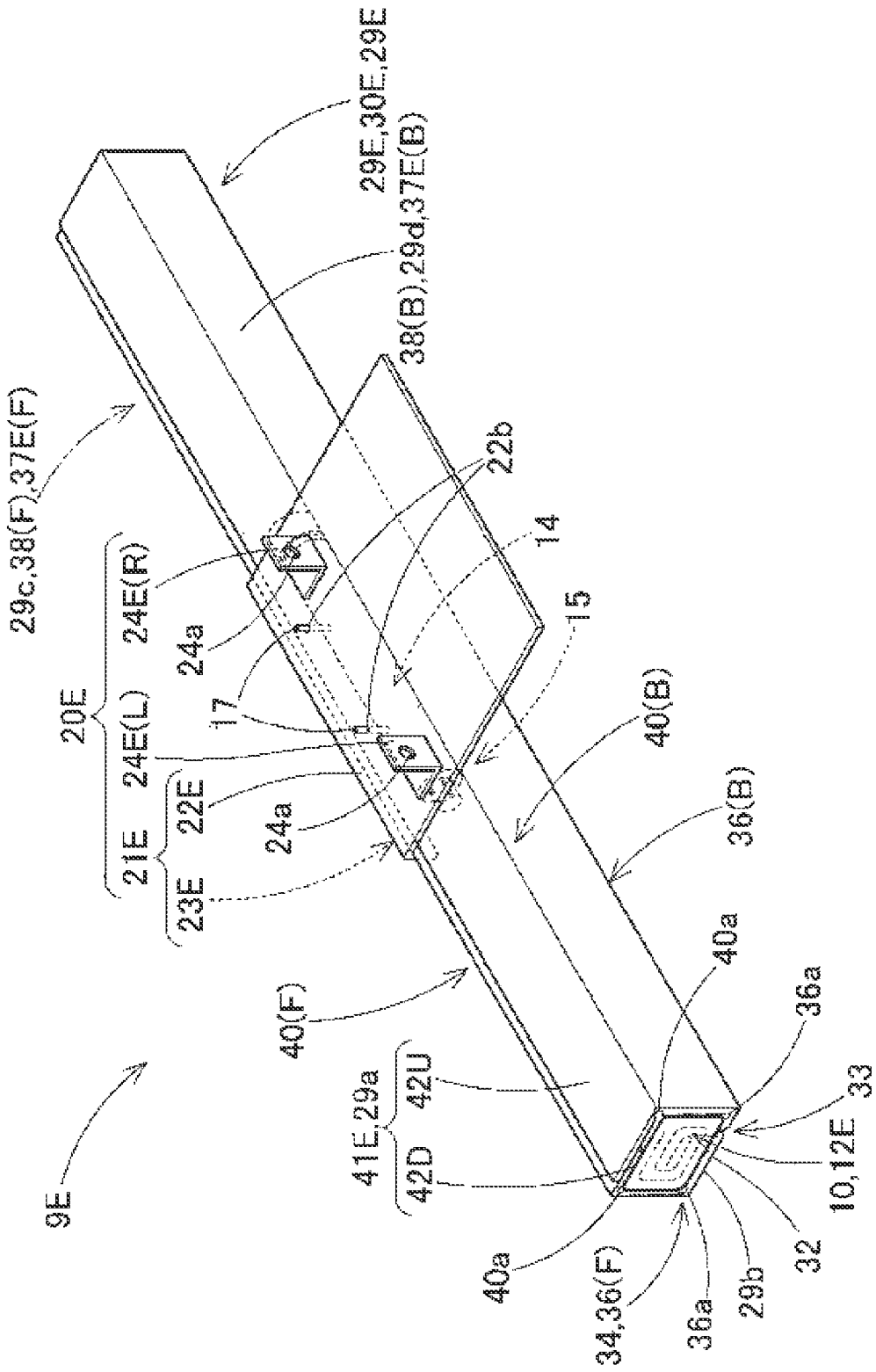

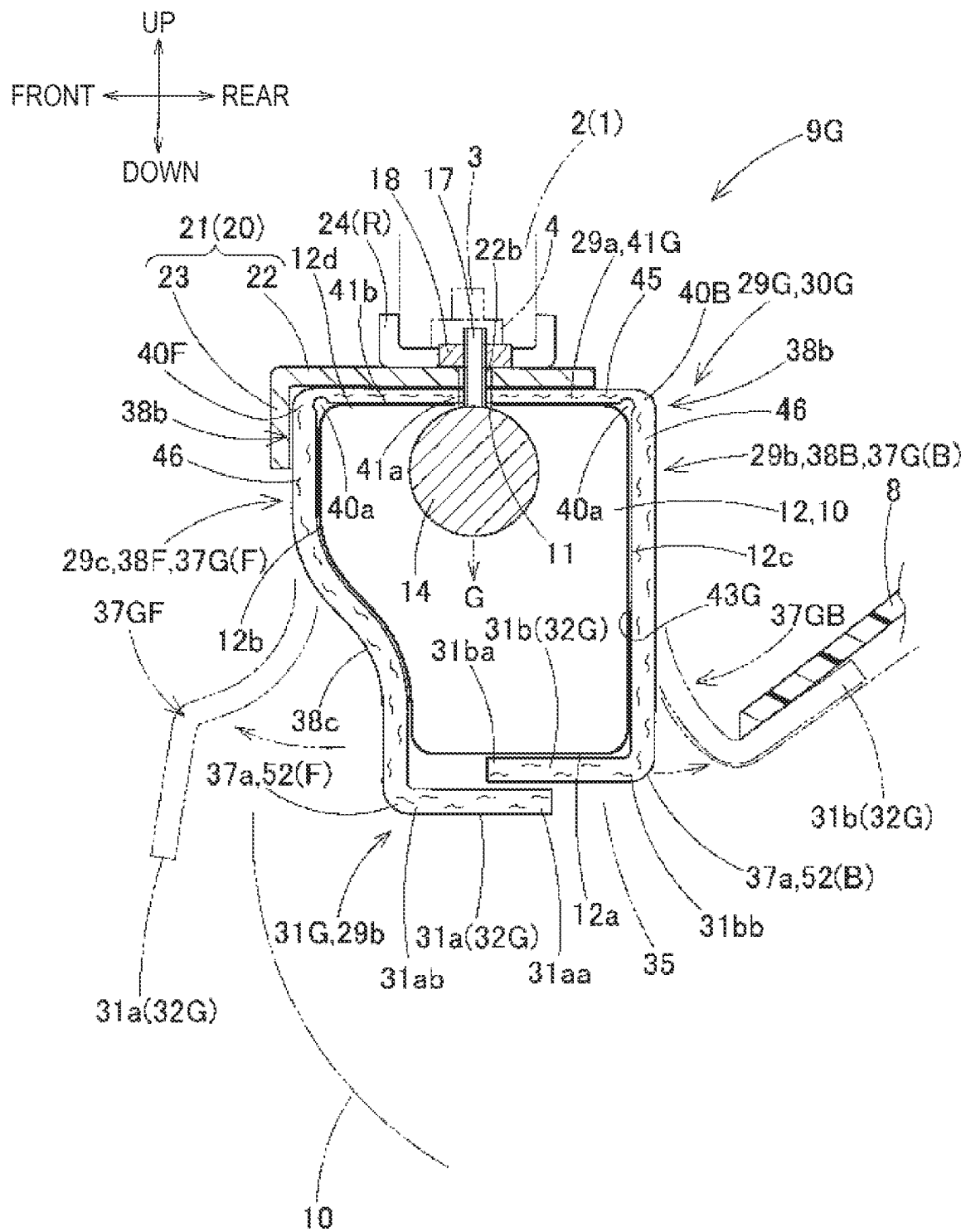

KNEE PROTECTION AIRBAG DEVICE

CROSS-REFERENCE TO RELATED APPLICATION(S)

This application is based upon and claims the benefit of priority from prior Japanese patent applications No. 2020-058915 filed on Mar. 27, 2020, and No. 2020-163772 filed on Sep. 29, 2020, the entire contents of which are incorporated herein by reference.

BACKGROUND

1. Field of the Invention

The present invention relates to a knee protection airbag device to be mounted on a lower side in front of a front passenger seat in a vehicle.

2. Description of the Related Art

In the related art, for example, a knee protection airbag device includes: an airbag for knee protection that is accommodated in a folded manner; an inflator that supplies an inflation gas to the airbag; an airbag cover made of synthetic resin and having a substantially rectangular parallelepiped shape that covers the airbag accommodated in a folded state and that has a door portion to be opened by being pushed by the airbag into which the inflation gas is flowed; and a case that holds the airbag, the inflator and the airbag cover, and that serves as an attachment base made of a sheet metal to be connected to a vehicle body side member (see, for example, JP-A-2018-47788). In addition, there is also known an airbag device in which a non-woven fabric is used to wrap a folded airbag and the non-woven fabric is thermally compressed so as to wrap the airbag compactly (see, for example, JP-A-2015-81082).

However, in the knee protection airbag device disclosed in JP-A-2018-47788 in the related art, the airbag cover is formed by die molding using a synthetic resin material such as a polyolefin-based thermoplastic elastomer. Specifically, the airbag cover is formed by injecting a molten resin into a molding die provided with a predetermined cavity, releasing the molded body after being cured, and further subjecting the molded body to deburring or the like. Therefore, it is difficult to easily form the airbag cover. Further, in the airbag device disclosed in JP-A-2015-81082, an airbag cover to cover a folded airbag uses a non-woven fabric and performs covering by wrapping the folded bag with the non-woven fabric that is thermally compressed. Here, it is necessary to provide a mold for thermally compressing the non-woven fabric in correspondence with a three-dimensional outer shape of the folded airbag, and it is also necessary to consider the influence of heat on an inflator during thermal compression, making it difficult to easily form the airbag cover.

SUMMARY

An object of the present invention is to provide a knee protection airbag device of which an airbag cover can be easily formed, thereby reducing the manufacturing man-hour and cost.

According to an aspect of the present invention, there is provided a knee protection airbag device that includes: an airbag for knee protection that is accommodated in a folded manner; an inflator that supplies an inflation gas to the airbag; an airbag cover that covers the airbag accommodated in a folded manner and that is capable of forming a protrusion-permitting opening for the airbag when pushed by the airbag that is inflated by the inflation gas; and an attachment base that holds the airbag, the inflator, and the airbag cover and that is connected to a vehicle body side member, in which the knee protection airbag device is mounted on a front lower side of a seat, and the airbag in inflation protrudes downward from a mounting portion and thereafter is deployed toward an upper rear side, and in which the airbag cover includes: a door disposition wall portion having a door portion that covers a lower portion of the airbag in a folded state and that is pushed open by the airbag inflated due to inflow of the inflation gas to allow forming of the protrusion-permitting opening; and connecting wall portions extending upward from a front edge and a rear edge of the door disposition wall portion and connected to the attachment base, and in which the airbag cover is formed of a sheet member made of a non-woven fabric, and in which the airbag cover includes: at least one bent portion that is formed by bending, from a portion of a recessed groove for bending that is formed by performing press working on the sheet member, so that wall portions on both sides of the recessed groove are brought close to each other; and a box-shaped accommodating recess that is defined by the at least one bent portion and that is capable of accommodating at least a part of the airbag.

In the knee protection airbag device, the airbag cover is provided with the recessed groove for the bent portion, which is to be bent, by subjecting the sheet member made of a non-woven fabric to press working. Further, the sheet member subjected to the press working is bent by using the recessed groove to form the bent portion where predetermined wall portions on both sides of the recessed groove are brought close to each other. In this way, the airbag cover can be formed, including: the door disposition wall portion having the door portion that allows forming of the protrusion-permitting opening; and the connecting wall portions that extend upward from the front edge and the rear edge of the door disposition wall portion. In addition, the airbag cover can define the box-shaped accommodating recess capable of accommodating at least a part of the airbag. Next, the airbag device can be assembled by assembling the airbag cover to the attachment base. Further, by simply subjecting the sheet member made of a non-woven fabric to press working to form the recessed groove and then simply bending a portion of the recessed groove, the airbag cover can define the accommodating recess capable of accommodating the airbag, without using die molding or the like, and further the sheet member is not subjected to press working in a state where the inflator is assembled. Therefore, the airbag cover can be easily formed without influence of heat on the inflator. Further, the airbag cover is used in a so-called bottom type knee protection airbag device whose mounting portion is on a lower side in front of a seat such as a front passenger seat and a driver's seat and of which the airbag at the time of inflation protrudes downward from the mounting portion and thereafter is deployed toward an upper rear side, and the door disposition wall portion of the airbag cover is directed downward in the vicinity of a vehicle floor, the airbag cover is not easily visible to an occupant. Therefore, even when the airbag cover is made of a non-woven fabric, may not have a good appearance design and may not be subjected to surface treatment such as coating, the airbag cover can be mounted on the vehicle without affecting the design of a vehicle interior on the front side of the seat.

Therefore, with the knee protection airbag device, the airbag cover can be easily formed, thereby reducing the manufacturing man-hour and cost. Further, even when the airbag cover is made of a non-woven fabric, it is not necessary to perform surface treatment such as coating for improving the design since the airbag cover is mounted at a portion that is not easily visible to an occupant, and thus it is possible to use the airbag cover as a component of the airbag device without any problem. Further, since the airbag cover is made of a non-woven fabric, the airbag cover is different from one made of a synthetic resin, a peripheral edge thereof is not likely to be torn and scattered even if the door portion of the door disposition wall portion is pushed open to form the protrusion-permitting opening, and tearing or the like of the airbag cover is not likely to occur even when feet of the occupant impact thereon. Therefore, the airbag cover can be suitably used as a component of the airbag device.

In the knee protection airbag device, the door portion of the door disposition wall portion of the airbag cover is configured to be opened by breaking a breakage-expected portion at a peripheral edge thereof when the door portion is pushed by the airbag that inflates, and the breakage-expected portion is formed by intermittently providing a cut portion of a fiber of the non-woven fabric with respect to the sheet member together with the recessed groove.

In such a configuration, when the airbag is inflated, the door portion of the door disposition wall portion is opened by breaking the breakage-expected portion at the peripheral edge so as to form the protrusion-permitting opening. In such an airbag cover, when the recessed groove for the bent portion is provided by performing press working on the sheet member made of a non-woven fabric for forming the airbag cover, and the cut portions of the fiber are provided intermittently for the breakage-expected portion, the door portion that allows forming of the protrusion-permitting opening of the airbag can be simply provided in the door disposition wall portion.

In the knee protection airbag device, the connecting wall portions of the airbag cover include side wall portions that extend upward from the front edge and the rear edge of the door disposition wall portion, and ceiling-constituting wall portions that overlap and are connected with each other, from upper ends of the side wall portions, passing through the bent portion formed by bending the portion of the recessed groove for bending, and with the door disposition wall portion, the side wall portions in front and rear, and the ceiling-constituting wall portions connected with each other, the airbag cover constitutes a bag cover body in a substantially rectangular tubular shape extending in a left-right direction that covers an overall periphery surrounding a front side, a rear side, an upper side and a lower side of the airbag in a folded state, and that defines the accommodating recess for accommodating the airbag.

In such a configuration, since the airbag cover can be used as the bag cover body that wraps the airbag in a folded state, it is not necessary to separately use a wrapping material for preventing the airbag in a folded state from collapsing, and the number of components and the number of assembly steps of the airbag device can be reduced.

In this case, in the knee protection airbag device, the inflator is accommodated in the airbag in a folded state, and includes an attachment fixture that protrudes from the airbag in a folded state and that is to be fastened to the attachment base, and the ceiling-constituting wall portions connected with each other are provided with an insertion hole into which the attachment fixture is to be inserted, and are connected with each other by being locked by the attachment fixture that is inserted into the insertion hole.

In such a configuration, as long as the airbag in a folded state is wrapped by the airbag cover and the ceiling-constituting wall portions of the airbag cover are locked by the attachment fixture, the airbag cover can maintain a substantially rectangular parallelepiped shape in a state of wrapping the airbag in a folded state without being spread, making it easy for the next assembly operation of the airbag device to the attachment base and the like.

In this case, in the knee protection airbag device, the airbag cover is configured to include a compressed portion at which the sheet member is compressed so as to reduce a thickness dimension thereof, and an uncompressed portion that is not compressed, and among the door disposition wall portion, the side wall portions in front and rear, and the ceiling-constituting wall portions connected with each other, at least the ceiling-constituting wall portions are formed of the compressed portion.

In such a configuration, the ceiling wall portions are formed of the compressed portion whose tear strength is improved by compressing the fibers of the non-woven fabric. Even when the wall portions of the airbag cover are pressed by the airbag that inflates, and a strong tensile force acts on a peripheral edge of the insertion hole in the ceiling-constituting wall portions of the airbag cover through which the attachment fixture is inserted, the ceiling-constituting wall portions can be stably assembled to the attachment base without breakage of the peripheral edge of the insertion hole.

In the knee protection airbag device, the door disposition wall portion of the airbag cover may include a front side portion and a rear side portion that are formed by extending, from lower ends of the connecting wall portions that are separated in a front-rear direction, so as to approach each other, the door portion may include the front side portion and the rear side portion, and when pushed by the airbag that inflates, the door portion may be pushed open so as to separate tip ends of the front side portion and the rear side portion from each other, thereby forming the protrusion-permitting opening, the connecting wall portions in front and rear may include side wall portions that extend upward from the front edge and the rear edge of the door disposition wall portion, and a ceiling wall portion that faces the door disposition wall portion and that is formed by connecting upper ends of the side wall portions in front and rear, and the accommodating recess for accommodating the airbag may be formed by the door disposition wall portion, the side wall portions in front and rear, and the ceiling wall portion, and the bent portion formed by bending the portion of the recessed groove for bending may be provided around the accommodating recess.

In such a configuration, although the door portion of the door disposition wall portion is not provided with a breakage-expected portion at a peripheral edge thereof, when the door portion is pushed by the airbag that inflates, the front side portion and the rear side portion of the door disposition wall portion are separated from each other, so that the protrusion-permitting opening can be formed. Further, in such a configuration, since the breakage-expected portion in which the fiber is cut intermittently is not provided, it is not necessary to manage a length, a pitch, and the like for a cut portion and the door portion of the door disposition wall portion can be easily provided.

In this case, as long as the front side portion and the rear side portion of the door disposition wall portion of the airbag cover are disposed such that the tip ends thereof overlap each other in the up-down direction, it is possible to prevent a foreign matter from entering the airbag cover since a portion where the protrusion-permitting opening is to be formed is blocked by the tip end of the front side portion and the tip end of the rear side portion that overlap each other in the up-down direction.

In the knee protection airbag device, the connecting wall portions in front and rear may include side wall portions that extend upward from the front edge and the rear edge of the door disposition wall portion, and a ceiling wall portion that faces the door disposition wall portion and that is formed by connecting upper ends of the side wall portions in front and rear, the box-shaped accommodating recess for accommodating the airbag may be defined by the door disposition wall portion, the side wall portions in front and rear, and the ceiling wall portion, and the bent portion formed by bending the portion of the recessed groove for bending may be provided around the accommodating recess, the door portion of the door disposition wall portion of the airbag cover may be joined, by a separable joining member, to an edge portion of the side wall portion that is adjacent to a tip end side of the door portion, and the joining member may release joining when pushed by the airbag that inflates, whereby the door portion is pushed open and the protrusion-permitting opening is formed.

In such a configuration, although the door portion of the door disposition wall portion is not provided with a breakage-expected portion at a peripheral edge thereof when the door portion is pushed by the airbag, the joining member joining the door disposition wall portion and the adjacent side wall portion releases the joining so that the protrusion-permitting opening can be formed. Further, in such a configuration, since the breakage-expected portion in which the fiber is cut intermittently is not provided, it is not necessary to manage a length, a pitch, and the like for a cut portion and the door portion of the door disposition wall portion can be easily provided.

In this case, the joining member may be formed by overlapping an edge at a tip end side of the door portion with an edge of the side wall portion adjacent thereto and thermally welding the edges to each other.

Alternatively, the joining member may be formed of a fitting protrusion and a fitting hole for fitting the fitting protrusion that are fitted with each other in a separable manner and that correspond to an edge at a tip end side of the door portion and an edge of the side wall portion adjacent thereto.

Further, the joining member may be formed of a tag pin that has a shaft portion penetrating an edge at a tip end side of the door portion and an edge of the side wall portion adjacent thereto in an overlapped state, and locking heads pressing peripheries of the penetrated edges at both ends of the shaft portion, and that joins the edge at a tip end side of the door portion and the edge of the side wall portion adjacent thereto in a separable manner.

Further, in the airbag cover in which the door disposition wall portion is not provided with the breakage-expected portion, the inflator is accommodated in the airbag in a folded state, and includes an attachment fixture that protrudes from the airbag in a folded state and that is to be fastened to the attachment base. The ceiling wall portion includes an insertion hole through which the attachment fixture is inserted. The airbag cover is configured to include a compressed portion at which the sheet member is compressed so as to reduce a thickness dimension thereof, and an uncompressed portion that is not compressed. In addition, among the door disposition wall portion, the side wall portions in front and rear, and the ceiling wall portion, at least the ceiling wall portion is provided at a portion of the compressed portion.

In such a configuration, even when the side wall portions of the airbag cover are pushed by the airbag that inflates, and a strong tensile force acts on a peripheral edge of the insertion hole in the ceiling wall portion of the airbag cover through which the attachment fixture is inserted, the ceiling wall portion can be stably assembled to the attachment base, without breakage of the peripheral edge of the insertion hole.

Further, in the knee protection airbag device, in the bent portion formed by bending the portion of the recessed groove for bending, the airbag cover may be provided with a bead having a convex shape protruding from an inner side toward an outer side in a direction orthogonal to the recessed groove.

In such a configuration, the bent portion can be reinforced by the bead, an intersection angle of the wall portions with the bent portion being interposed therebetween can be stably maintained, and an accommodating space (space in the accommodating recess) for the airbag cover in a folded state can be stably secured at an inner side of the airbag cover. Further, a shape of the airbag in a folded state that is accommodated in the accommodating space can be stabilized. As a result, for example, even when the foot or the like of the occupant hits a portion near the bent portion, the airbag cover is unlikely to be deformed, and the airbag accommodated in the accommodating space in the airbag cover can maintain the shape of being folded constant, thereby contributing to stabilizing a subsequent deployment behavior of the airbag at the time of inflation.

In the knee protection airbag device, the sheet member has a basis weight in a range of 200 $g/m^2$ to 1500 $g/m^2$, desirably in a range of 400 $g/m^2$ to 800 $g/m^2$, and a tensile breaking strength (a tensile breaking strength that is lower in a case where the strength is different between the longitudinal direction and the transverse direction of the sheet member) in a range of 100 N/5 cm to 3000 N/5 cm, desirably in a range of 300 N/5 cm to 1500 N/5 cm, and is made of a non-woven fabric using short fibers.

That is, a non-woven fabric using short fibers is a general-purpose fabric, in which short fibers are bonded to each other by an adhesive or a low melting point fiber, or in which short fibers are intertwined with each other (so-called felt), and can be suitably used in terms of bending rigidity and formability. As the material of the short fibers, general-purpose materials such as polyethylene, polypropylene, polyamide, and polyester can be used.

When a basis weight of the non-woven fabric is too small, the non-woven tends to bend and it is difficult to secure shape retainability of the wall portions with the bent portion being interposed therebetween; when the basis weight of the non-woven fabric is too large, the non-woven fabric is too high in rigidity and it is difficult to form the bent portion by bending. Therefore, the basis weight thereof is in a range of 200 $g/m^2$ to 1500 $g/m^2$, and is desirably in a range of 400 $g/m^2$ to 800 $g/m^2$.

When the tensile breaking strength of the non-woven fabric is too low, the bent portion or the like in addition to the breakage-expected portion may break at the time of inflation of the airbag; when the tensile breaking strength thereof is too high, a smooth breakage of the breakage-expected portion may be obstructed and breakage at other portions may be caused. Therefore, the tensile breaking strength thereof is in a range of 100 N/5 cm to 3000 N/5 cm, and is desirably in a range of 300 N/5 cm to 1500 N/5 cm.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 8A is a perspective view illustrating a sheet member subjected to press working that forms a modification of the airbag cover according to the first embodiment;

FIG. 8B is a another perspective view illustrating the sheet member subjected to press working that forms the modification of the airbag cover according to the first embodiment;

FIG. 9 is a schematic longitudinal cross-sectional view of an airbag device using the airbag cover illustrated in FIGS. 8A and 8B;

FIG. 11 is a schematic perspective view of a modification of the airbag device according to the first embodiment;

FIG. 13 is a schematic longitudinal cross-sectional view of an airbag device according to a second embodiment;

DETAILED DESCRIPTION OF THE INVENTION

Figure 1:
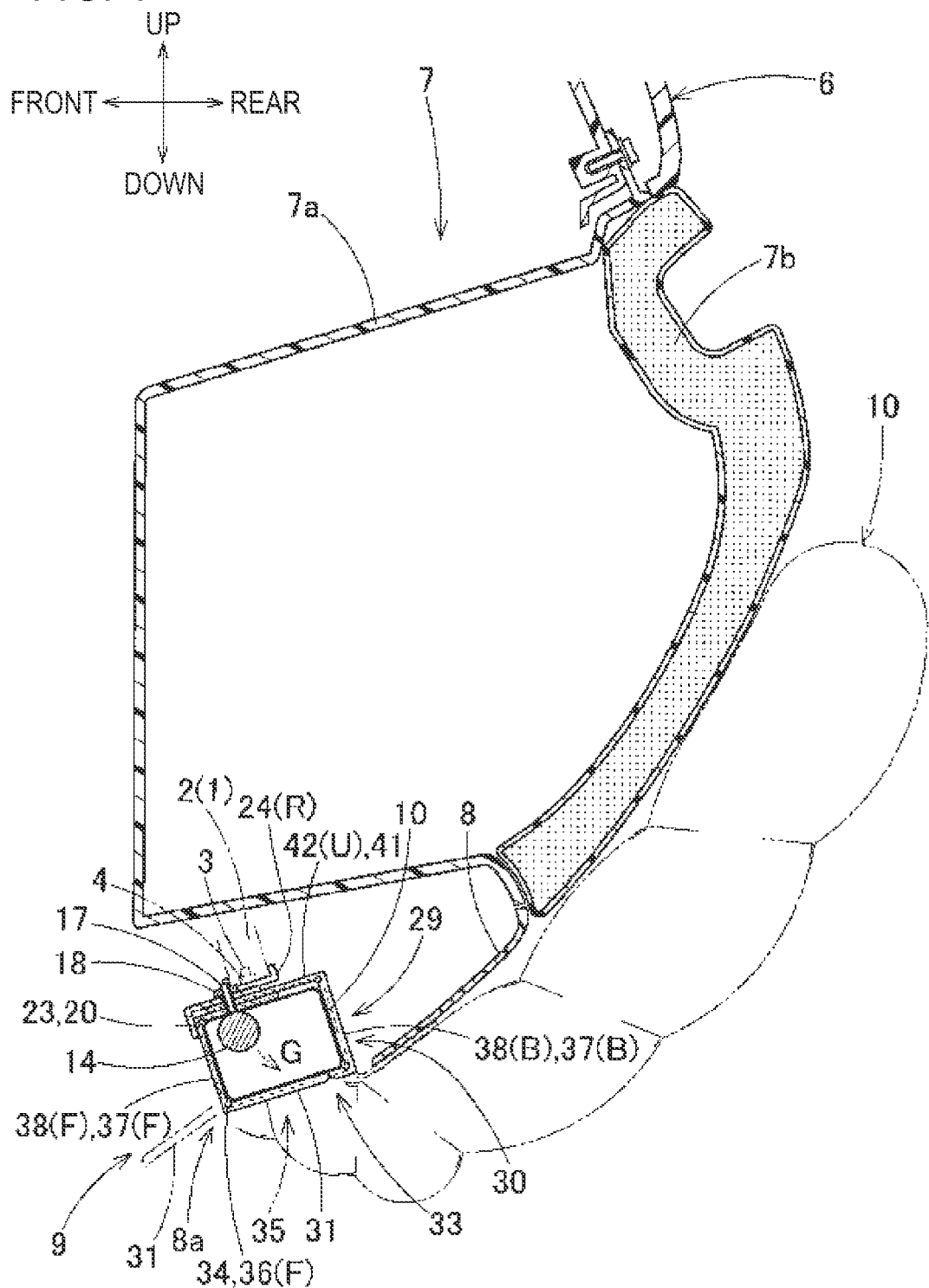
FIG. 1 is a schematic longitudinal cross-sectional view illustrating a knee protection airbag device in a state of being mounted on a vehicle, according to a first embodiment of the present invention.
Figure 2:
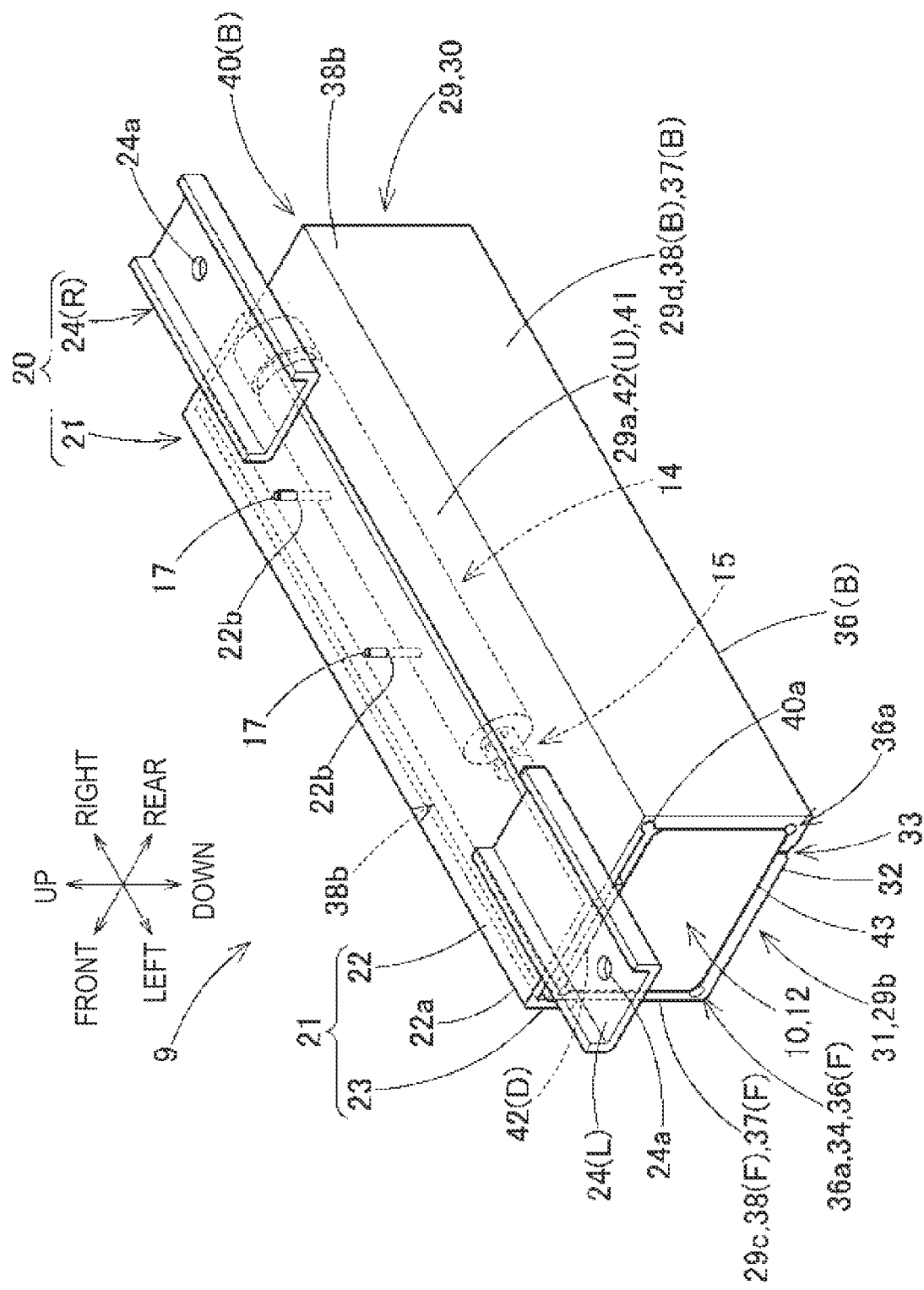
FIG. 2 is a schematic perspective view of the airbag device according to the first embodiment as viewed from an upper surface side.
Figure 3:
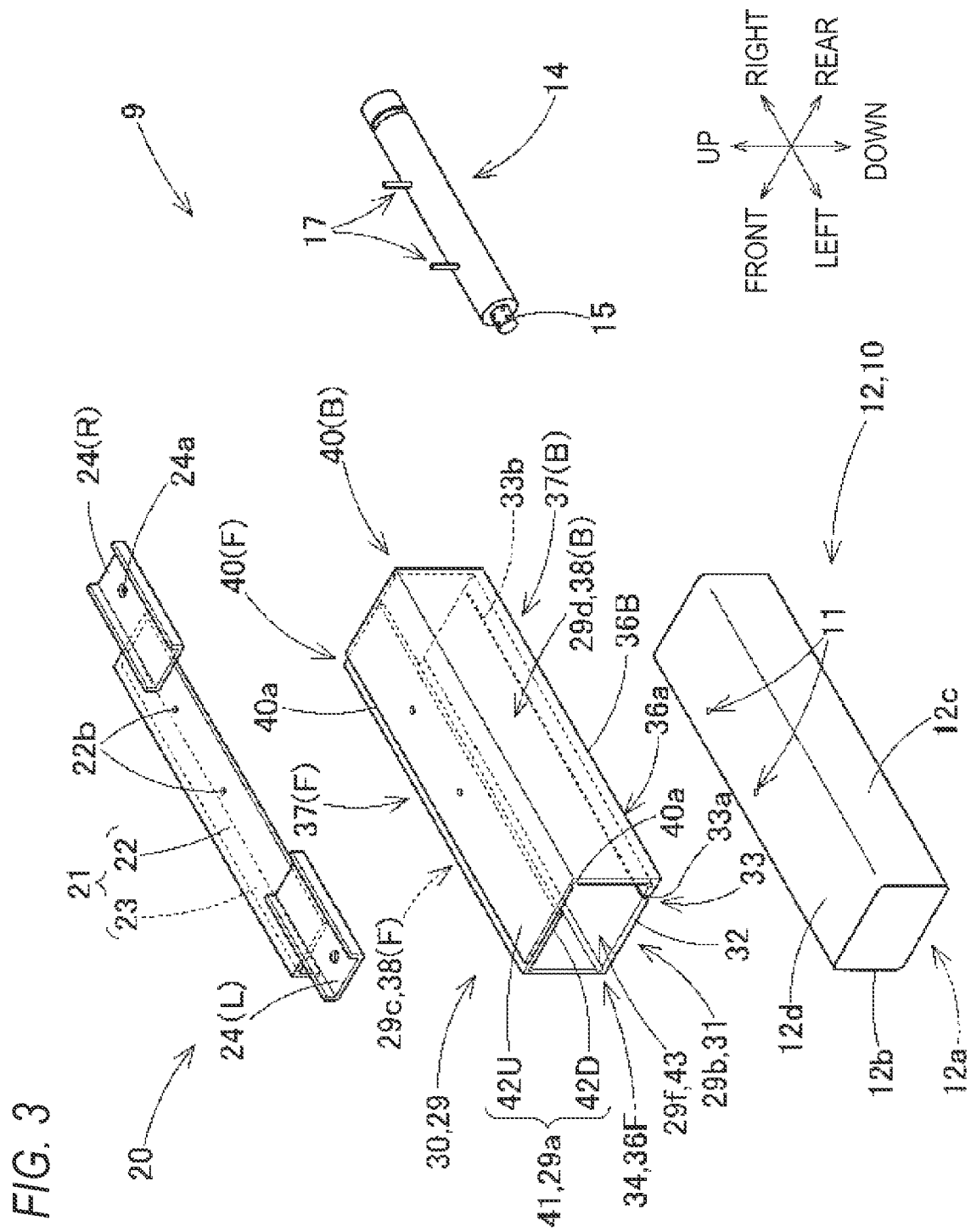
FIG. 3 is a schematic exploded perspective view of the airbag device according to the first embodiment.

Hereinafter, a knee protection airbag device according to a first embodiment of the present invention will be described with reference to the drawing. As illustrated in FIG. 1, a knee protection airbag device 9 according to the first embodiment is mounted on a lower portion of an instrument panel (appropriately abbreviated as panel) 6 in front of a front passenger seat, specifically below a glove box 7 disposed on a lower portion of the panel 6. The glove box 7 includes a box body 7a and a door portion 7b that closes the box body 7a from a rear side, and the door portion 7b is disposed so as to be openable by turning an upper edge thereof rearward. Further, below the glove box 7, an under cover 8 is disposed. At an opening 8a of the under cover 8, a door disposition wall portion 31 of an airbag cover 30 to be described later of the airbag device 9 is disposed. The airbag device 9 is mounted on a lower side in front of the front passenger seat.

Directions of front, rear, up, down, left and right in the description substantially correspond to directions of the airbag device 9 in a state of being mounted on a vehicle, and as illustrated in FIGS. 1 to 4, a length direction of a substantially rectangular body portion 21 of an attachment base 20, which will be described later, is described as the left-right direction, and a width direction thereof as the front-rear direction, and an orthogonal direction of the body portion 21 as the up-down direction.

The airbag device 9 is a so-called "bottom type" knee protection airbag device 9 having a configuration in which an airbag 10 to be described later at the time of inflation protrudes downward from a mounting portion thereof and then is deployed toward an upper rear side. As illustrated in FIGS. 1 to 4, the airbag device 9 includes: the airbag 10 for knee protection that is accommodated in a folded manner; an inflator 14 that supplies an inflation gas G to the airbag 10; the airbag cover 30 that covers the airbag 10 accommodated in a folded state and has a door portion 32 to be opened by being pushed by the airbag 10 into which the inflation gas G is flowed; and the attachment base 20 that holds the airbag 10, the inflator 14, and the airbag cover 30, and that is connected to a bracket 2 serving as a vehicle body side member on a body 1 side.

The airbag 10 is folded in a state in which the inflator 14 is housed inside, and is wrapped by a bag cover body 29 formed of the airbag cover 30. The airbag 10 is provided with two attachment holes 11 and 11 through each of which an attachment fixture 17 formed of a bolt protruding from the inflator 14 is passed.

The inflator 14 has a substantially columnar shape, and a plurality of gas discharge ports 15 for discharging the inflation gas G are provided at a tip end thereof. As described above, the inflator 14 is provided with two attachment fixtures 17 each formed of a bolt projecting upward.

In the inflator 14 according to the first embodiment, the two attachment fixtures 17 protrude directly from an outer circumferential surface thereof. As the inflator, there is one including a substantially columnar inflator body having a gas discharge port for discharging inflation gas, and a substantially cylindrical retainer covering the inflator body, and in that case, an attachment fixture may protrude from the retainer. In such a configuration, the retainer is housed in an airbag with the attachment fixture protruding, and the inflator body in the retainer is assembled through a predetermined insertion hole of the airbag with respect to the folded airbag.

The attachment base 20 according to the first embodiment is made of a sheet metal such as a steel plate, and includes the substantially rectangular plate-like body portion 21. At both left and right ends of the body portion 21, attachment bracket portions 24 (L, R) that are attached and fixed to the bracket 2 extending from the body 1 side of the vehicle are provided respectively.

The body portion 21 has an upper wall portion 22 extending in the left-right direction and a side wall portion 23 extending downward from a front edge 22a of the upper wall portion 22, and presents an L shape in cross-section. The upper wall portion 22 is formed with through holes 22b through which the attachment fixtures 17 pass. The upper wall portion 22 is configured to be shorter than a width dimension in the front-rear direction of an upper lateral wall portion 29a of the substantially rectangular tubular bag cover body 29 serving as the airbag cover 30. Further, the side wall portion 23 is configured to be shorter than an overall length dimension of a front side wall portion 38F so as to support at least an upper end 38b side of an outer peripheral surface 38a of the front side wall portion 38F of the airbag cover 30 to be described later.

The attachment bracket portions 24 (L, R) are joined to both left and right edges of the upper wall portion 22 respectively by welding or the like, and attachment holes 24a penetrate the attachment bracket portions 24 (L, R) respectively. Each of the attachment bracket portions 24 (L, R) is fastened to the bracket 2 on the body 1 side using a nut 4 and a bolt 3 (see two-dot chain lines in FIGS. 1 and 4) passing through the attachment hole 24a, so that the airbag device 9 is mounted on a front lower side of the front passenger seat below the glove box 7.

The airbag cover 30 is formed of a sheet member 50 made of a non-woven fabric. The non-woven fabric according to the embodiment is formed by bonding short fibers such as polyethylene, polypropylene, polyamide, and polyester to each other using an adhesive or a low melting point fiber, or by intertwining.

The airbag cover 30 according to the first embodiment is formed of the bag cover body 29 having a substantially rectangular tubular shape surrounding the airbag 10 extending in the left-right direction. The bag cover body 29 having a substantially rectangular tubular shape defines a box-shaped accommodating recess 43 capable of accommodating the entire airbag 10 in a folded state, and includes the upper lateral wall portion 29a and a lower lateral wall portion 29b that face each other in the up-down direction, and a front vertical wall portion 29c and a rear vertical wall portion 29d that face each other in the front-rear direction and that connect front edges and rear edges of the upper lateral wall portion 29a and the lower lateral wall portion 29b.

In the airbag cover 30, a portion constituting the lower lateral wall portion 29b is set as the door disposition wall portion 31 covering a lower portion of the airbag 10 in a folded state, and portions extending upward from front and rear edges of the door disposition wall portion 31 and connected to the attachment base 20 are set as connecting wall portions 37 (F, B). The connecting wall portion 37 (F, B) according to the first embodiment includes a front vertical wall portion 29c and a rear vertical wall portion 29d, and further includes a portion constituting the upper lateral wall portion 29a. In the first embodiment, portions constituting the front vertical wall portion 29c and the rear vertical wall portion 29d are set as front and rear side wall portions 38 (F, B), and a portion constituting the upper lateral wall portion 29a is set as a ceiling wall portion 41, and further the ceiling wall portion 41 is a portion where ceiling-constituting wall portions 42 (U, D) are overlapped in the case of the present embodiment.

The door disposition wall portion 31 includes a door portion 32 that is pushed open at the time of inflation of the airbag 10 to form a protrusion-permitting opening 35. At a front edge side of the door portion 32, a bent portion 36F where the door disposition wall portion 31 and the front side wall portion 38F intersect with each other is set as a hinge portion 34 that serves as a rotation center at the tune when the door portion 32 is opened, and at a rear edge side thereof, a breakage-expected portion 33 is provided that breaks when the door portion 32 is pushed open. The breakage-expected portion 33 is formed by performing press working on the sheet member 50, and is configured such that cut portions 33b obtained by cutting fibers of the non-woven fabric are formed intermittently along the left-right direction. In addition, the breakage-expected portion 33 is provided with a recessed groove 33a along the left-right direction and the cut portions 33b are formed in the recessed groove 33a, so that stress is easily concentrated on the cut portions 33b.

The bent portion 36F of the door disposition wall portion 31 intersecting the front side wall portion 38F and a bent portion 36B thereof intersecting the rear side wall portion 38B are each provided with a recessed groove 36a for bending that is formed by performing press working on the sheet member 50, and are each formed by bending a portion of the recessed groove 36a so that wall portions on both sides of the recessed groove 36a (wall portions 31 and 38F, and wall portions 31 and 38B) are brought close to each other (substantially orthogonal to each other).

The ceiling-constituting wall portions 42U and 42D that overlap each other are provided with insertion holes 42a through which the attachment fixtures 17 pass. The insertion holes 42a are formed by performing drilling working on the sheet member 50 at the same time when performing press working thereon. In addition, a bent portion 40F of the ceiling-constituting wall portion 42D intersecting the front side wall portion 38F and a bent portion 40B of the ceiling-constituting wall portion 42U intersecting the rear side wall portion 38B are each provided with a recessed groove 40a for bending that is formed by performing press working on the sheet member 50, and are each formed by bending a portion of the recessed groove 40a so that wall portions on both sides of the recessed groove 40a (wall portions 42D and 38F, and wall portions 42U and 38B) are brought close to each other (substantially orthogonal to each other).

The ceiling-constituting wall portions 42U and 42D that overlap each other are connected, in a manner of overlapping each other, by inserting the attachment fixture 17 into the insertion hole 42a and locking a peripheral edge of the insertion hole 42a with the attachment fixture 17.

Figure 5A:
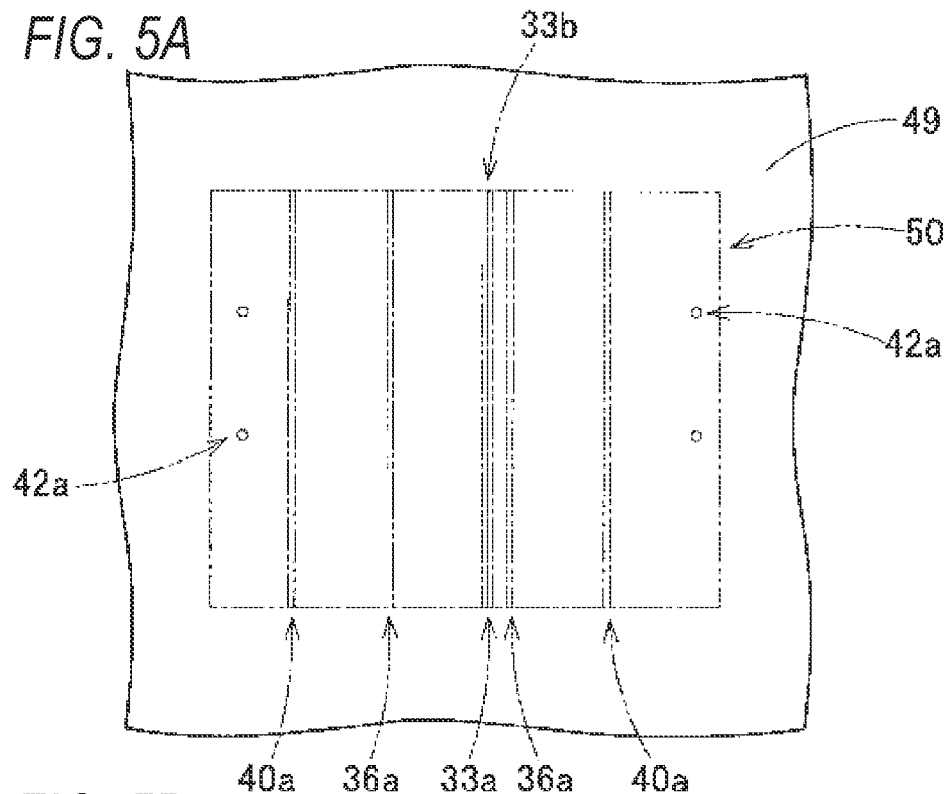
FIG. 5A is a diagram illustrating a manufacturing process of an airbag cover according to the first embodiment.
Figure 5B:
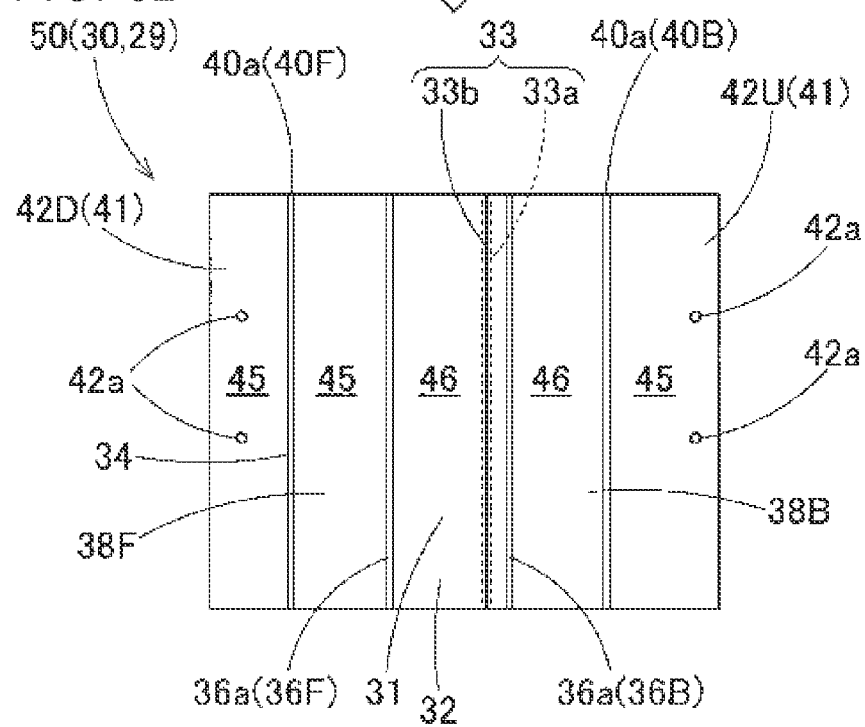
FIG. 5B is another diagram illustrating the manufacturing process of an airbag cover according to the first embodiment.

In a process of forming the airbag cover 30 from the sheet member 50, as illustrated in FIGS. 5A and 5B, a rolled non-woven fabric material 49 is flatly deployed, and with press working, the sheet member 50 is cut out, and at this time, the recessed grooves 33a, 36a, 40a, the cut portions 33b, and the insertion hole 42a are formed.

Figure 6A:
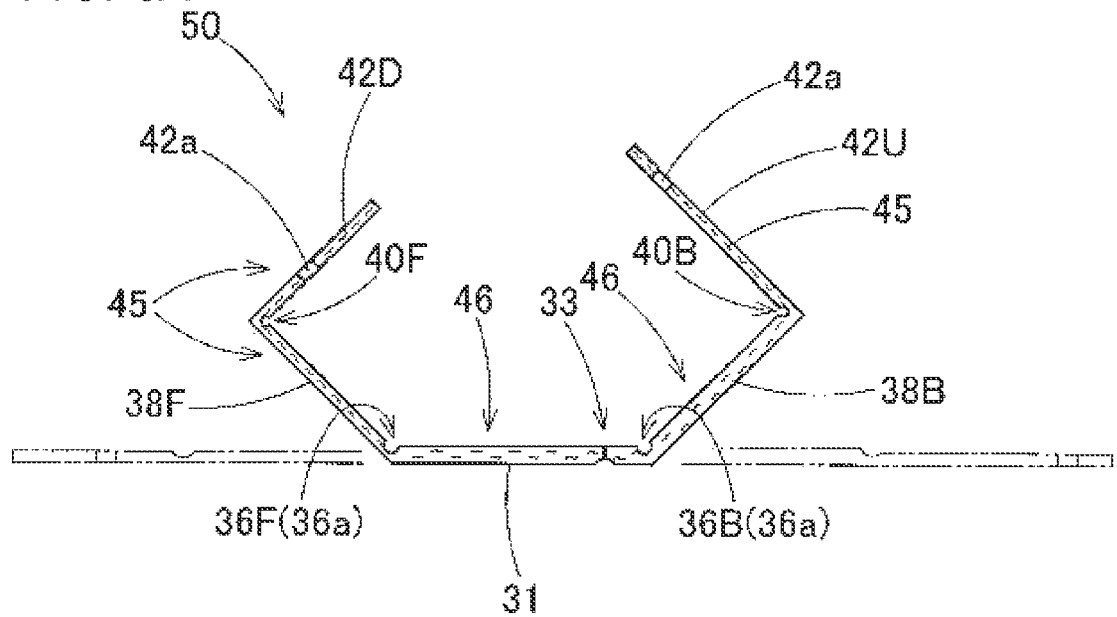
FIG. 6A is a diagram illustrating an assembly process of the airbag cover according to the first embodiment.
Figure 6B:
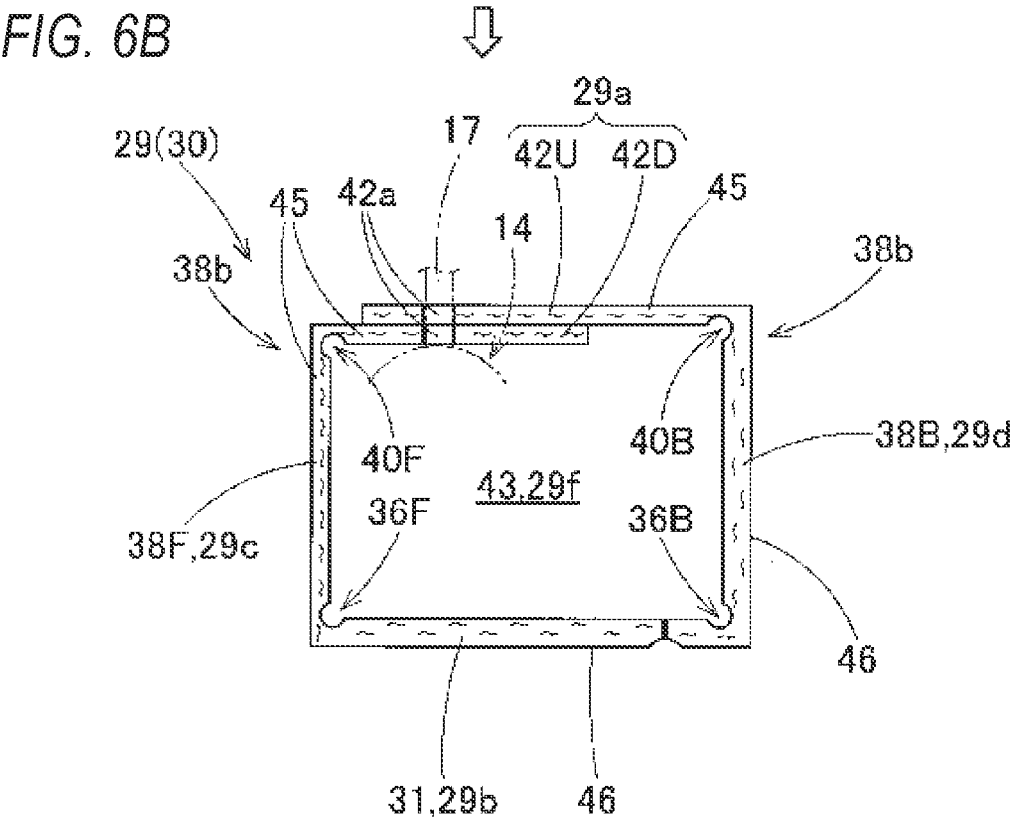
FIG. 6B is another diagram illustrating the assembly process of the airbag cover according to the first embodiment.
Figure 7:
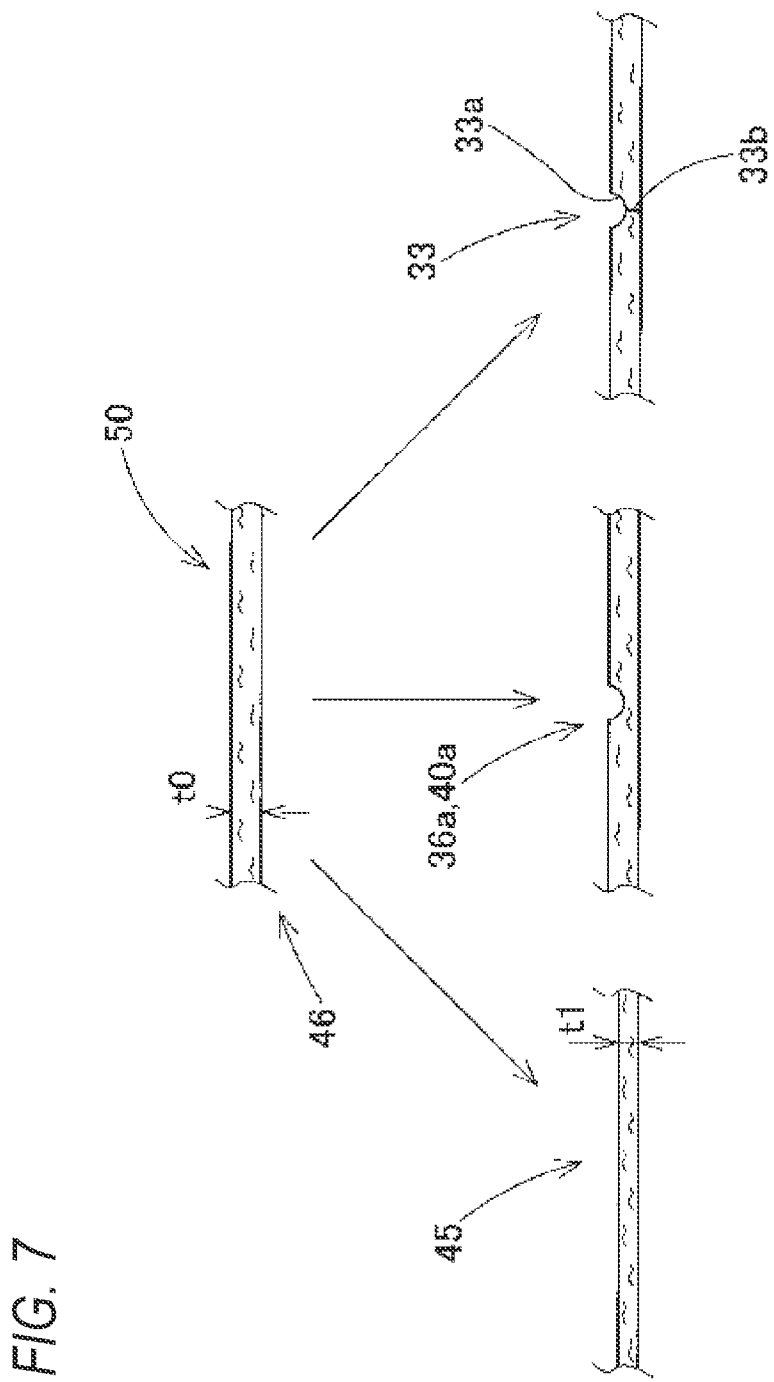
FIG. 7 is a diagram for illustrating a state where press working is performed on a sheet member for forming an airbag cover according to the first embodiment.

In the case of the first embodiment, a portion of the sheet member 50 is compressed to be thinner so that a thickness dimension t0 thereof is set to a thickness dimension t1, thereby forming a compressed portion 45 and an uncompressed portion 46 that is not compressed. In the case of the present embodiment, the ceiling-constituting wall portions 42U and 42D and the front side wall portion 38F are the compressed portions 45, and the rest of the door disposition wall portion 31 and the rear side wall portion 38B are the uncompressed portions 46. In the sheet member 50 having the recessed grooves 33a and the like, as illustrated in FIGS. 6A and 6B, when the portions of the recessed grooves 36a and 40a are bent, the airbag cover 30 as the bag cover body 29 having a substantially rectangular tubular shape can be formed.

In addition, in the first embodiment, at the time of bending the portions of the recessed grooves 36a and 40a, a side on which the recessed grooves 36a and 40a are provided is set as an inner side, and alternatively an opposite surface thereof on which the recessed grooves 36a and 40a are not provided may be set as an inner side.

Further, the non-woven fabric (non-woven fabric material) 49 forming the sheet member 50 has the following physical properties.

When a basis weight of the non-woven fabric 49 is too small, the non-woven fabric tends to bend and it is difficult to secure shape retainability of the wall portions 31, 38, and 42 with the bent portions 36 (F, B) and 40 (F, B) being interposed therebetween, and when the basis weight of the non-woven fabric 49 is too large, the non-woven fabric 49 is too high in rigidity and it is difficult to form the bent portions 36 (F, B) and 40 (F, B) by bending. Therefore, the basis weight thereof is in a range of 200 g/m$^2$ to 1500 g/m$^2$, and is preferably set to 600 g/m$^2$ in a range of 400 g/m$^2$ to 800 g/m$^2$.

When a tensile breaking strength of the non-woven fabric 49 is too low, the bent portion 36 or the like in addition to the breakage-expected portion 33 may break at the time of inflation of the airbag 10, and when the tensile breaking strength thereof is too high, a smooth breakage of the breakage-expected portion 33 may be obstructed and breakage at other portions may be caused. Therefore, the tensile breaking strength thereof is in a range of 100 N/5 cm to 3000 N/5 cm, and is preferably set to 530 N/5 cm in a range of 300 N/5 cm to 1500 N/5 cm. With respect to the tensile breaking strength described above, in a case where the strength is different between the longitudinal direction and the transverse direction of the sheet member, the tensile breaking strength that is lower is taken as a reference, and normally, the tensile breaking strength in the longitudinal direction is taken as the reference. In the above, the case is described where the tensile breaking strength in the longitudinal direction with a lower strength is taken as the reference.

An assembly operation of the airbag device 9 according to the first embodiment is described. First, the inflator 14 is accommodated in the airbag 10 such that the attachment fixtures 17 protrude therefrom, and the airbag 10 is folded to form a folded body 12. Then the door disposition wall portion 31 of the airbag cover 30 is brought into contact with a bottom surface 12a of the folded body 12, and next the bent portions 36F and 36B are bent to bring the front side wall portion 38F and the rear side wall portion 38B into contact with a front side surface 12b and a rear side surface 12c of the folded body 12 respectively. Further, the bent portions 40F and 40B are bent and the attachment fixtures 17 are inserted into the insertion holes 42a respectively, and the ceiling-constituting wall portions 42U and 42D of the airbag cover 30 are placed on a ceiling surface 12d of the folded body 12 and are connected in a manner of overlapping with each other. In this way, the bag cover body 29 formed of the airbag cover 30 can wrap the folded body 12, which is formed by folding the airbag 10, while preventing collapse of the airbag 10. Thereafter, by inserting each attachment fixture 17 into the through hole 22b of the attachment base 20 and fastening a nut 18 to each attachment fixture 17, the airbag device 9 can be assembled. Further, after the airbag device 9 is assembled, an actuation signal line (not shown) extending from the inflator 14 is connected to a predetermined connector, and the attachment bracket portions 24 (L, R) of the attachment base 20 can be attached to the bracket 2 on the body 1 side by using the bolts 3 and the nuts 4. In this way, the airbag device 9 can be mounted on a predetermined mounting portion below the glove box 7.

When the inflator 14 is actuated after the airbag device 9 is mounted, the inflation gas G is discharged from the gas discharge ports 15. The airbag 10 is deployed and inflated, breaks the breakage-expected portion 33 of the airbag cover 30 and pushes open the door portion 32 to form the protrusion-permitting opening 35, and finally is disposed on a front side of the knees of an occupant in the front passenger seat through the protrusion-permitting opening 35.

In the airbag device 9 according to the first embodiment, the airbag cover 30 is provided with the recessed grooves 36a and 40a for the bent portions 36 and 40, which are to be bent, by subjecting the sheet member 50 made of a non-woven fabric to press working. Further, the sheet member 50 subjected to the press working is bent by using the recessed grooves 36a and 40a to form the predetermined bent portions 36 and 40. In this way, the airbag cover 30 can be formed, including: the door disposition wall portion 31 having the door portion 32 that allows forming of the protrusion-permitting opening 35; and the connecting wall portions 37 that extend upward respectively from the front and rear edges of the door disposition wall portion 31. In addition, the airbag cover 30 can define the box-shaped accommodating recess 43 capable of accommodating the airbag 10. Next, the airbag device 9 can be assembled by assembling the airbag cover 30 to the attachment base 20. Further, by simply subjecting the sheet member 50 made of a non-woven fabric to press working to form the recessed grooves 36a and 40a and then simply bending portions of the recessed groove 36a and 40a, the airbag cover 30 can define the box-shaped accommodating recess 43 capable of accommodating the airbag 10, without using die molding or the like, and further the sheet member 50 is not subjected to press working in a state where the inflator 14 is assembled. Therefore, the airbag cover 30 can be easily formed without influence of heat on the inflator 14. Further, the airbag cover 30 is used in a so-called bottom type knee protection airbag device 9 whose mounting portion is on a lower side in front of the front passenger seat and of which the airbag 10 at the time of inflation protrudes downward from the mounting portion and thereafter is deployed toward an upper rear side, and the door disposition wall portion 31 of the airbag cover 30 is directed downward in the vicinity of a vehicle floor, the airbag cover 30 is not easily visible to an occupant. Therefore, even when the airbag cover 30 is made of a non-woven fabric, may not have a good appearance design and may not be subjected to surface treatment such as coating, the airbag cover 30 can be mounted on the vehicle without affecting the design of a vehicle interior on the front side of the seat.

Therefore, with the knee protection airbag device 9 according to the first embodiment, the airbag cover 30 can be easily formed, thereby reducing the manufacturing man-hour and cost. Further, even when the airbag cover 30 is made of a non-woven fabric, it is not necessary to perform surface treatment such as coating for improving the design since the airbag cover 30 is mounted at a portion that is not easily visible to an occupant, and thus it is possible to use the airbag cover 30 as a component of the airbag device 9 without any problem. Further, since the airbag cover 30 is made of a non-woven fabric, the airbag cover 30 is different from one made of a synthetic resin, a peripheral edge thereof is not likely to be torn and scattered even if the door portion 32 of the door disposition wall portion 31 is pushed open so as to form the protrusion-permitting opening 35, and tearing or the like of the airbag cover 30 is not likely to occur even when feet of the occupant impact thereon. Therefore, the airbag cover 30 can be suitably used as a component of the airbag device 9.

In the knee protection airbag device 9 according to the first embodiment, the door portion 32 of the door disposition wall portion 31 of the airbag cover 30, at the time of being pushed by the inflated airbag 10, is opened by breaking the breakage-expected portion 33 at an peripheral edge thereof. The breakage-expected portion 33 is formed together with the recessed grooves 36a and 40a at the time when the sheet member 50 is subjected to press working, and is formed by providing the cut portions 33b of the fibers of the non-woven fabric intermittently on the sheet member 50.

Therefore, in the airbag device 9 according to the first embodiment, when the airbag 10 is inflated, the door portion 32 of the door disposition wall portion 31 is opened by breaking the breakage-expected portion 33 at the peripheral edge so as to form the protrusion-permitting opening 35. In such an airbag cover 30, as long as the recessed grooves 36a and 40a for the bent portions are provided by performing press working on the sheet member 50 made of a non-woven fabric for forming the airbag cover, and the cut portions 33b of the fibers are provided intermittently for the breakage-expected portion 33, the door portion 32 that allows forming of the protrusion-permitting opening 35 of the airbag 10 can be simply provided in the door disposition wall portion 31.

Further, in the first embodiment, the connecting wall portions 37 (F, B) of the airbag cover 30 include the side wall portions 38F and 38B that extend upward from the front and rear edges of the door disposition wall portion 31 respectively, and the ceiling-constituting wall portions 42U and 42D that overlap and are connected with each other, from the upper ends 38b of the side wall portions 38F and 38B, passing through the bent portions 36, 40 that are formed by bending portions of the recessed grooves 36a, 40a for bending. With the door disposition wall portion 31, the front and rear side walls 38F and 38B, and the ceiling-constituting wall portions 42U and 42D connected with each other, the airbag cover 30 constitutes the bag cover body 29 in a substantially rectangular tubular shape extending in the left-right direction that covers an overall periphery surrounding a front side, a rear side, an upper side and a lower side of the airbag 10 in a folded state, that is, the overall periphery including the bottom surface 12a, the front and rear side surfaces 12b and 12c, and the ceiling surface 12d of the folded body 12 of the airbag 10, and that defines the box-shaped accommodating recess 43 for accommodating the airbag 10.

Therefore, in the first embodiment, since the airbag cover 30 can be used as the bag cover body 29 that wraps the folded airbag 10, it is not necessary to separately use a wrapping material for preventing the folded airbag 10 from collapsing, and the number of components and the number of assembly steps of the airbag device 9 can be reduced.

In this case, in the first embodiment, the inflator 14 is accommodated in the airbag 10 in a folded state, and includes the attachment fixtures 17 that protrude from the airbag 10 in a folded state and are to be fastened to the attachment base 20. The ceiling-constituting wall portions 42U and 42D to be connected with each other include the insertion holes 42a through which the attachment fixtures 17 are inserted, and are connected with each other by being locked by the attachment fixtures 17 inserted through the insertion holes 42a.

Therefore, in the first embodiment, as long as the folded airbag 10 is wrapped by the airbag cover 30 and the ceiling-constituting wall portions 42U and 42D of the airbag cover 30 are locked by the attachment fixtures 17, the airbag cover 30 can maintain a substantially rectangular parallelepiped shape in a state of wrapping the folded airbag 10 without being spread, making it easy for the next assembly operation of the airbag device 9 to the attachment base 20 and the like.

Further, in the first embodiment, the airbag cover 30 is configured to include the compressed portion 45, at which the sheet member 50 is compressed so as to reduce the thickness dimension thereof, and the uncompressed portion 46 that is not compressed, and among the door disposition wall portion 31, the front and rear side wall portions 38F and 38B, and the ceiling-constituting wall portions 42U and 42D connected with each other, at least the ceiling-constituting wall portions 42U and 42D are the compressed portion 45. In the first embodiment, the front side wall portion 38F is also the compressed portion 45.

Therefore, in the first embodiment, the ceiling wall portions 42U and 42D are formed of the compressed portion 45 whose tear strength is improved by compressing the fibers of the non-woven fabric. Even when the wall portions 31, 38 and 42 of the airbag cover 30 are pressed by the airbag 10 that inflates, and a strong tensile force acts on the peripheral edge of each insertion hole 42a of the ceiling-constituting wall portions 42U and 42D of the airbag cover 30 through which the attachment fixture 17 is inserted, the ceiling-constituting wall portions 42U and 42D can be stably assembled to the attachment base 20 without breakage of the peripheral edge of the insertion hole 42a.

When the thickness dimension t1 of the compressed portion 45 of the sheet member 50 is too small, bending rigidity thereof decreases, and when the thickness dimension t1 is too large, undesired improvement of the tear strength is caused. Therefore, it is preferred that the thickness dimension t1 is set at about 20% to 40% of the thickness dimension t0 of the uncompressed portion 46 (in the embodiment, it is about 20%).

Further, the airbag cover made of the non-woven fabric may not cover the overall periphery surrounding the folded airbag, and may be configured as an airbag cover 30A illustrated in FIGS. 8 and 9 that defines a box-shaped accommodating recess 43A having a U-shaped cross section for accommodating a part of the airbag 10.

The airbag cover 30A is configured to include the door disposition wall portion 31 that has the door portion 32 provided with the breakage-expected portion 33 at a peripheral edge thereof and that covers a lower portion of the airbag 10 in a folded state, and side wall portions 39 (F, B) serving as connecting wall portions 37A (F, B) that extend upward from front and rear edges of the door disposition wall portion 31 via the bent portions 36F and 36B respectively and cover a front portion and a rear portion of the airbag 10 in a folded state respectively. In addition, the airbag cover 30A is formed of a sheet member 50A made of a non-woven fabric.

In the airbag cover 30A, similarly to that in the first embodiment, the bent portions 36F and 36B are each formed by bending a portion of the recessed groove 36a for bending, which is formed by subjecting the sheet member 50A to press working, so that wall portions on both sides of the recessed groove 36a (wall portions 31 and 39F, and wall portions 31 and 39B) are brought close to each other (substantially orthogonal to each other), and the breakage-expected portion 33 is formed with the cut portions 33b of fibers of the non-woven fabric that are formed by subjecting the sheet member 50A to press working and that are intermittently provided. Further, in the illustrated breakage-expected portion 33, the recessed groove 33a is also formed so that stress is easily concentrated on the cut portions 33b.

Similarly to the sheet member 50 of the first embodiment, the sheet member 50A is obtained by subjecting the non-woven fabric (non-woven fabric material) 49 using short fibers to press working and by cutting in a predetermined shape, is formed with the recessed grooves 33a and 36a and the cut portions 33b, and further is provided with a plurality of locking holes 39a in side wall portions 39F and 39B by drilling. Locking hooks 23a formed on side wall portions 23A extending downward from front and rear edges of an upper wall portion 22A of an attachment base 20A are inserted into the locking holes 39a of the side wall portions 39F and 39B, and each locking hook 23a locks a peripheral edge of the locking hole 39a so that the airbag cover 30A is held by the attachment base 20A.

Although the attachment base 20A of an airbag device 9A in which the airbag cover 30A is assembled is made of a sheet metal and includes a body portion 21A and the attachment bracket portion 24, the attachment base 20A is different from the attachment base 20 in the first embodiment in that: an upper wall portion 22A of the body portion 21A includes side wall portions 23A that are broader in a with dimension in the front-rear direction, extend downward from front and rear edges thereof respectively and cover front and rear sides of each of the side wall portions 39F and 39B of the airbag cover 30A, and as described above each side wall portion 23A is provided with the locking hooks 23a to be locked with the locking holes 39a. Further, as described above, the airbag cover 30A is provided with only the door disposition wall portion 31 and the side wall portions 39F and 39B serving as the connecting wall portions 37A (F, B), and the side wall portions 39F and 39B are provided with the locking holes 39a to be locked with the locking hooks 23a of the attachment base 20A, making the airbag cover 30A different from that in the first embodiment. The inflator 14 and the airbag 10 are the same as in the first embodiment, and are configured to be held by the attachment base 20A by penetrating the upper wall portion 22A of the attachment base 20A with the attachment fixture 17, which protrudes from the airbag 10 in a folded state, from the through hole 22b and fastening the nut 18.

Also in the airbag device 9A, similarly to the first embodiment, by subjecting the sheet member 50A made of a non-woven fabric to press working, as illustrated in FIGS. 8A and 8B, the airbag cover 30A is provided with the recessed grooves 36a for the bent portions 36 to be bent, and is intermittently provided with the cut portions 33b of the fibers for the breakage-expected portion 33 at the peripheral edge of the door portion 32 that is to be pushed open by the inflated airbag 10, and further the sheet member 50A subjected to press working is bent by using the recessed grooves 36a to form the predetermined bent portions 36F and 36B. In this way, the airbag cover 30A can be formed that includes the door disposition wall portion 31 provided with the breakage-expected portion 33, and the side wall portions 39F and 39B serving as the connecting wall portions 37AF and 37AB extending upward from the front and rear edges of the door disposition wall portion 31, and then the airbag device 9A can be assembled by attaching the airbag cover 30A to the attachment base 20A. By simply subjecting the sheet member 50A made of a non-woven fabric to press working to form the recessed grooves 36a and the cut portions 33b, the airbag cover 30A can be formed simply by bending the sheet member 50A, without using die molding or the like. Therefore, the airbag cover 30A can be easily formed, and operations and effects similar to those of the airbag device 9 in the first embodiment can be obtained.

Figure 4:
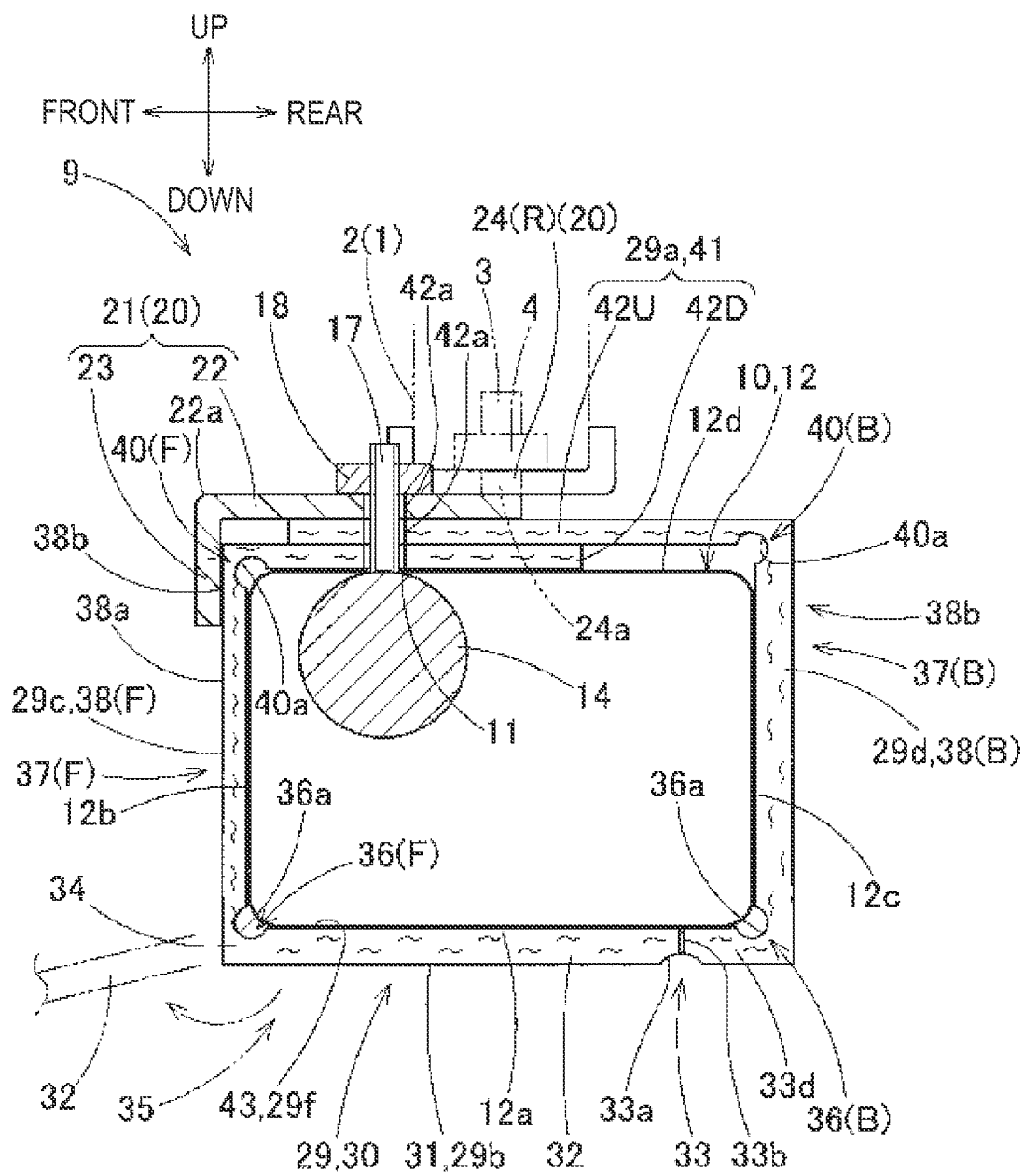
FIG. 4 is a schematic longitudinal cross-sectional view of the airbag device according to the first embodiment.

In the airbag device 9A, upper portions of the front and rear side wall portions 38 (F, B) of the airbag cover 30A are covered by the side wall portions 23A of the attachment base 20A; in contrast, in the airbag device 9, as illustrated in FIG. 4, an entire range in the up-down direction of the rear side wall portion 38B, which is to be deployed by the airbag 10, in the side wall portions 38 (F, B) of the airbag cover 30 is not covered by the side wall portion 23 of the attachment base 20. Therefore, when the door portion 32 is opened at the time the airbag 10 is deployed and inflated, a lower end portion of the side wall portion 38B is bent rearward together with a rear edge portion 33d in the door disposition wall portion 31 that expands from the breakage-expected portion 33 to the bent portion 36B, so that the protrusion-permitting opening 35 for the airbag 10 can be widened to allow the airbag to be deployed and inflated quickly.

Figure 10:
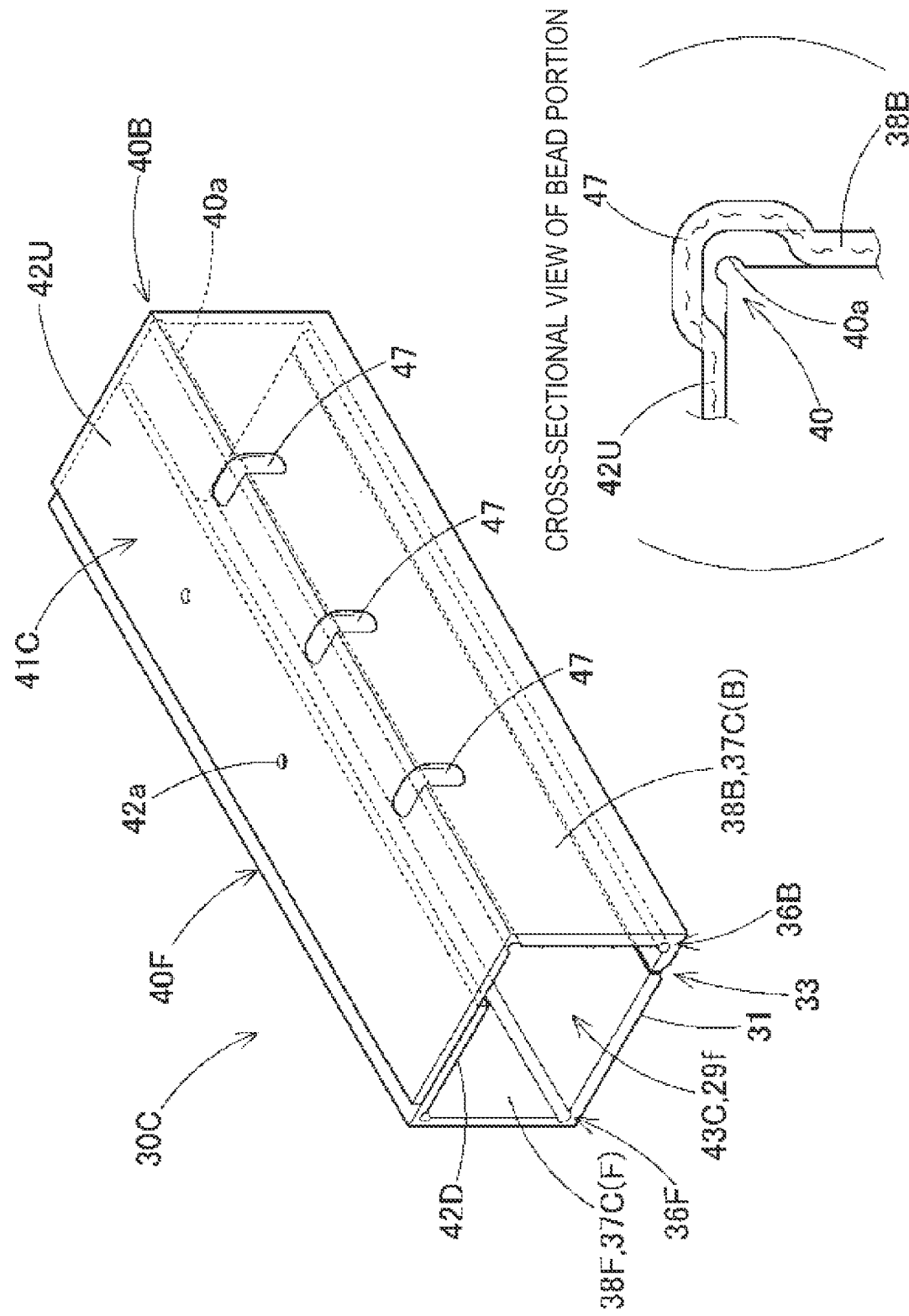
FIG. 10 is a perspective view of another modification of the airbag cover according to the first embodiment.

In the airbag cover 30 according to the first embodiment, the bent portion is provided with a recessed groove so as to be easily bent, and may be configured as illustrated in an airbag cover 30C shown in FIG. 10 so as to increase strength of the bent portion at a desired position. That is, with respect to the airbag cover 30C, at the time of performing press working on a sheet member, a bent portion 40(B) is provided with a predetermined number (three in the example) of beads 47 each having a convex shape protruding from an inner side toward an outer side in a direction orthogonal to the recessed groove 40a.

In the airbag cover 30C, the bent portion 40 can be reinforced by the beads 47, an intersection angle of the wall portions 42U and 38B with the bent portion 40(B) being interposed therebetween can be stably maintained, and an accommodating space 29f in a box-shaped accommodating recess 43C for accommodating the folded airbag 10 can be stably secured at an inner side of the airbag cover 30. Further, a shape of the folded airbag 10 accommodated in the accommodating space 29f can be stabilized. As a result, for example, even when the foot or the like of the occupant hits the side wall portion 38B near the bent portion 40(B), the airbag cover 30C is unlikely to be deformed, and the airbag 10 accommodated in the accommodating space 29f in the airbag cover 30C can maintain the shape of being folded constant, thereby contributing to stabilizing a subsequent deployment behavior of the airbag at the time of inflation.

Figure 12A:
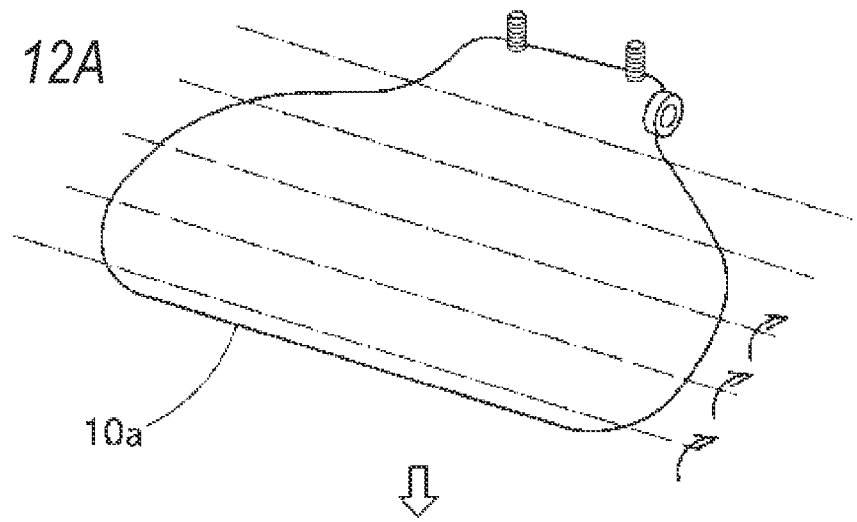
FIG. 12A is a diagram illustrating a folded body of an airbag of the airbag device illustrated in FIG. 11.
Figure 12B:
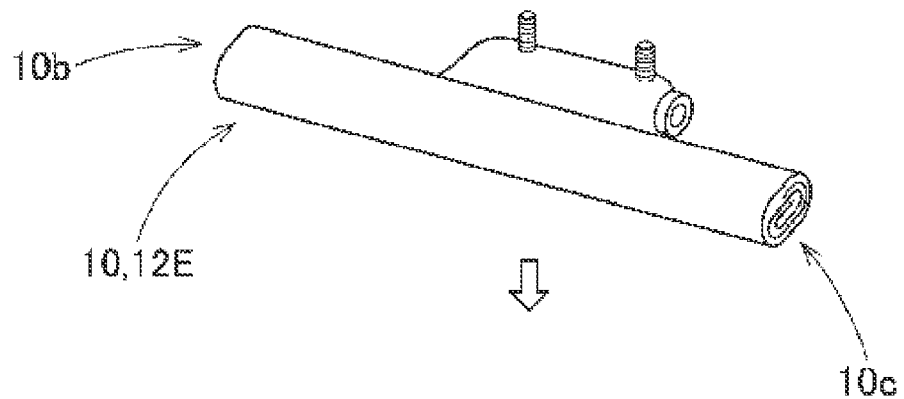
FIG. 12B is another diagram illustrating the folded body of the airbag of the airbag device illustrated in FIG. 11.
Figure 12C:
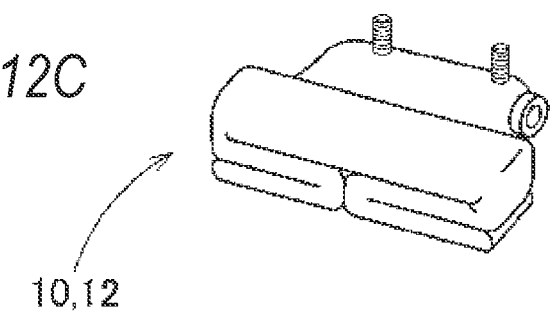
FIG. 12C is still another diagram illustrating the folded body of the airbag of the airbag device illustrated in FIG. 11.

In the airbag device 9, the folded body 12 of the airbag 10 is formed as illustrated in FIGS. 12A, 12B, and 12C, where the airbag 10 is folded up in rolls from a tip end 10a in a flatly deployed state, and further both left and right ends 10b and 10c, which are folded in rolls, are folded so as to approach each other at a center. Alternatively, the folded body 12 of the airbag 10 may be configured as a folded body 12E of an airbag device 9E illustrated in FIG. 11. The folded body 12E is formed such that the airbag 10 is folded up in rolls from the tip end 10a in a flatly deployed state and both left and right ends 10b and 10c are not folded back as illustrated in FIGS. 12A and 12B. In addition, the folded body 12E has a larger length dimension in the left-right direction and a smaller cross-sectional shape, as compared with the folded body 12 of the first embodiment.

As illustrated in FIG. 11, an airbag cover 30E (bag cover body 29E) covering the folded body 12E has an elongated shape obtained by elongating the airbag cover 30 so as to correspond to the elongated folded body 12E. Parts similar to those of the airbag cover 30 (bag cover body 29) are denoted by same reference signs, and a description thereof will be omitted.

Further, in an attachment base 20E, an upper wall portion 22E of a body portion 21E is shaped such that a side wall portion 23E is provided at a front edge thereof and a rear end thereof extends rearward than the upper lateral wall portion 29a of the bag cover body 29E. Further, on an upper surface, the upper wall portion 23E is provided with attachment brackets 24E (L, R) each having an L-shaped cross section and each having the attachment hole 24a for attachment to a vehicle body side member.

The airbag device 9E may be configured as described above, and in the airbag device 9E configured as described above, since a height dimension in the up-down direction can be kept small, it is possible to suitably mount the airbag device 9E at a portion where space in the up-down direction is narrow.

Next, a knee protection airbag device 9G illustrated in FIG. 13 according to a second embodiment will be described. The airbag device 9G is configured to include the airbag 10, the inflator 14, and the attachment base 20 similar to those in the first embodiment, and an airbag cover 30G is configured to be different from the airbag cover 30 of the first embodiment in the following manner. The same members and parts as those in the first embodiment are denoted by the same reference signs as those in the first embodiment, and a description thereof is omitted as appropriate.

In the airbag cover 30G, a door disposition wall portion 31G provided on a lower side includes a front side portion 31a and a rear side portion 31b that extend so as to approach each other from lower ends 37a of connecting wall portions 37G (F, B) separated in the front-rear direction, and a door portion 32G is formed of the front side portion 31a and the rear side portion 31b. When pushed by the airbag 10 that inflates, the door portion 32G is pushed open, with a tip end 31aa of the front side portion 31a being separated from a tip end 31ba of the rear side portion 31b, thereby forming the protrusion-permitting opening 35.

The front and rear connecting wall portions 37G (F, B) extending upward from front and rear edges of the door disposition wall portion 31G include the side wall portions 38 (F, B) extending upward respectively from a front edge of the front side portion 31a and a rear edge of the rear side portion 31b, and include a ceiling wall portion 41G that faces the door disposition wall portion 31 and that is formed by connecting the upper ends 38b of the side wall portions 38 (F, B) to each other. In the ceiling wall portion 41G, an insertion hole 41a for inserting the attachment fixture 17 extending from the inflator 14 is formed.

In the airbag cover 30G, a box-shaped accommodating recess 43G having a substantially rectangular tubular shape for accommodating the airbag 10 is defined by the door disposition wall portion 31G, the front and rear side wall portions 38F and 38B, and the ceiling wall portion 41G.

In the case of the second embodiment, around the accommodating recess 43G at boundary portions between the ceiling wall portion 41G and the front side wall portion 38F and between the ceiling wall portion 41G and the rear side wall portion 38B, bent portions 40 (F, B) are provided respectively that are each formed by bending a portion of a recessed groove 40a for bending so that wall portions on both sides of the recessed groove 40a (wall portions 41G and 38F, and wall portions 41G and 38B) are brought close to each other (substantially orthogonal to each other).

Figure 14:
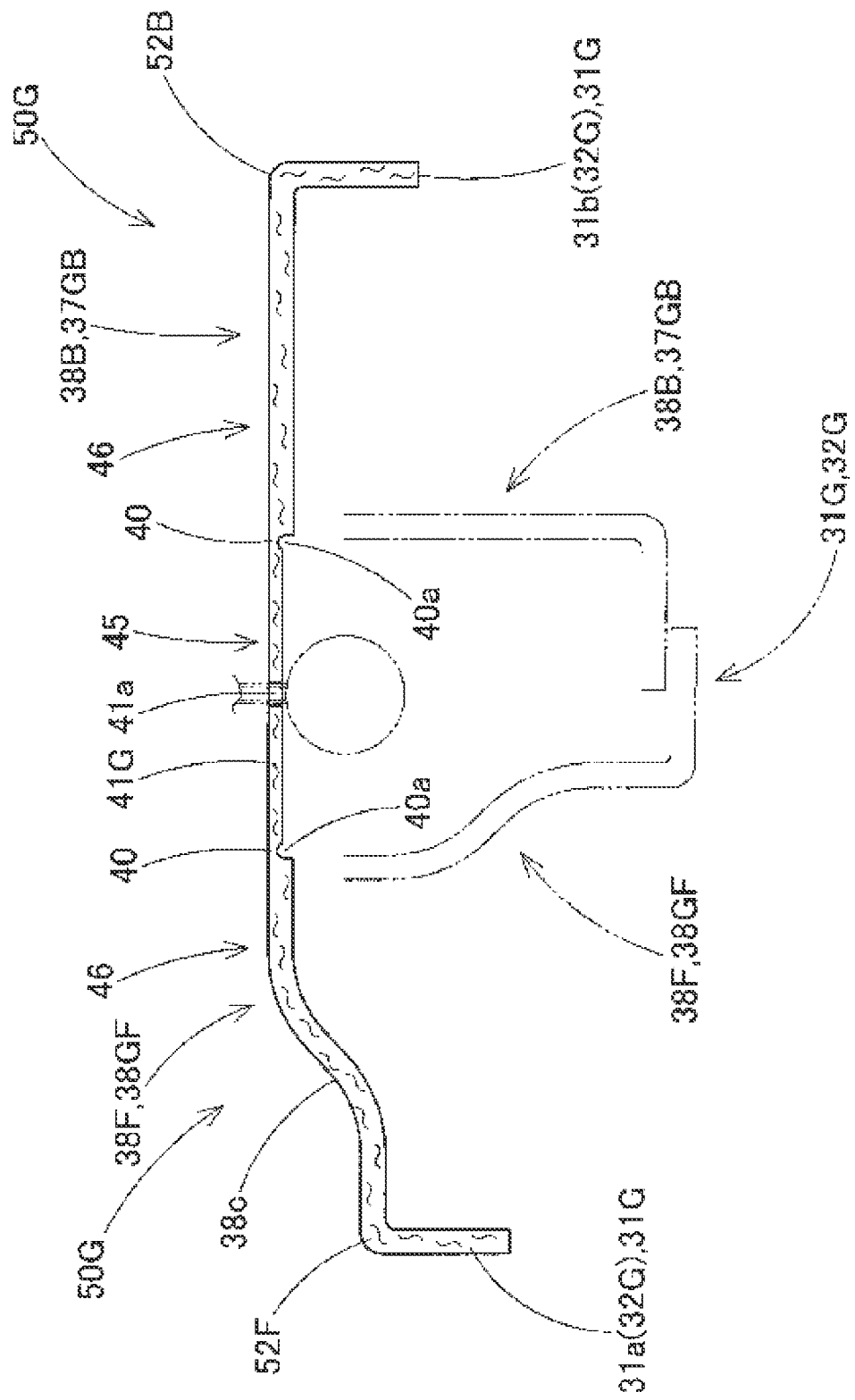
FIG. 14 is cross-sectional view illustrating a sheet member subjected to press working for forming an airbag cover according to the second embodiment.

As illustrated in FIG. 14, a sheet member 50G forming the airbag cover 30G is formed by performing press working on a sheet member made of a non-woven fabric similar to that of the first embodiment, and the compressed portion 45 and the insertion holes 41a are formed in a portion of the ceiling wall portion 41G, and the recessed grooves 40a for bending are formed in the vicinity of both front and rear edges of the ceiling wall portion 41G respectively. In the vicinity of base portions 31ab and 31bb of the front side portion 31a and the rear side portion 31b that form the door portion 32G, bent portions 52 (F, B) bent approximately 90 degrees from the side wall portions 38F and 38B are formed by press working.

Further, in the side wall portion 38F, a recess 38c is formed so as to prevent interference with an adjacent member such as a surrounding duct at the time when the airbag device 9G is mounted on a vehicle, and the recess 38 is also formed simultaneously with the recessed grooves 40a, the bent portions 52, and the like when the sheet member 50G is subjected to press working.

An assembly operation of the airbag device 9G according to the second embodiment will be described. Similarly to the first embodiment, first, the inflator 14 is accommodated in the airbag 10 such that the attachment fixtures 17 protrude therefrom, further the airbag 10 is folded to form the folded body 12, and the ceiling surface 12d of the folded body 12 is brought into contact with a lower surface 41b of the ceiling wall portion 41G while inserting the attachment fixtures 17 extending from the inflator 14 into the insertion holes 41a in the ceiling wall portion 41G of the airbag cover 30G. Next, the portions of the front and rear recessed grooves 40a are bent to form the bent portions 40F and 40B, and the side wall portions 38F and 38B are brought into contact with the side surfaces 12b and 12c of the folded body 12, and the tip end 31*aa* of the front side portion 31*a* and the tip end 31*ba* of the rear side portion 31*b*, of the door disposition wall portion 31G, overlap each other. In bending and deforming the bent portions 40F and 40B, the bent portions 40F and 40B are bent and deformed plastically so as to maintain a state in which the tip end 31*aa* of the front side portion 31*a* and the tip end 31*ba* of the rear side portion 31*b* are overlapped. Therefore, in a box-shaped bag cover body 29G formed of the airbag cover 30G, the folded body 12 obtained by folding the airbag 10 can be wrapped while preventing collapsing of the airbag 10.

Thereafter, by inserting each attachment fixture 17 into the through hole 22*b* of the attachment base 20 and fastening the nut 18 to each attachment fixture 17, the airbag device 9G can be assembled. Further, after the airbag device 9G is assembled, an actuation signal line (not shown) extending from the inflator 14 is connected to a predetermined connector, and the attachment bracket portions 24 (L, R) of the attachment base 20 can be attached to the bracket 2 on the body 1 side by using the bolts 3 and the nuts 4. In this way, the airbag device 9G can be mounted on a predetermined mounting portion below the glove box 7 (see FIG. 1).

When the inflator 14 is actuated after the airbag device 9G is mounted, the inflation gas G is discharged from the gas discharge port 15 (see FIG. 2) and the airbag 10 is deployed and inflated. The front side portion 31*a* and the rear side portion 31*b* of the door portion 32G of the door disposition wall portion 31G are pushed by the airbag 10, which inflates, to be separated from each other, and the protrusion-permitting opening 35 can be formed. The inflated airbag 10 is finally disposed on the front side of the knees of an occupant in the front passenger seat through the protrusion-permitting opening 35.

Also in the airbag device 9G according to the second embodiment, by subjecting the sheet member 50G made of a non-woven fabric to press working, the airbag cover 30G is provided with the recess 38*c* and the bent portions 52 (F, B) as well as the recessed grooves 40*a* for the bent portions 40. Further, the sheet member 50G subjected to the press working is bent by using the recessed grooves 40*a* to form the predetermined bent portions 40 (F, B). In this way, the airbag cover 30G can be formed, including: the door disposition wall portion 31 having the door portion 32G that allows forming of the protrusion-permitting opening 35; and the connecting wall portions 37G that include the side wall portions 38 (F, B) extending upward from the front and rear edges of the door disposition wall portion 31 and the ceiling wall portion 41G. In addition, the airbag cover 30G can define the box-shaped accommodating recess 43G capable of accommodating the airbag 10. Therefore, operations and effects similar to those of the first embodiment can be obtained.

Further, in the second embodiment, although the door portion 32G of the door disposition wall portion 31G is not provided with a breakage-expected portion at a peripheral edge thereof, when the door portion 32G is pushed by the airbag 10 that inflates, the front side portion 31*a* and the rear side portion 31*b* of the door disposition wall portion 31G are separated from each other, so that the protrusion-permitting opening 35 can be formed. Therefore, in such a configuration, since the breakage-expected portion in which the fibers are cut intermittently is not provided, it is not necessary to manage a length, a pitch, and the like for a cut portion, and the door portion 32G of the door disposition wall portion 31G can be easily provided.

Further, in the second embodiment, the front side portion 31*a* and the rear side portion 31*b* of the door disposition wall portion 31G of the airbag cover 30G are disposed such that the tip ends 31*aa* and 31*ba* thereof overlap each other in the up-down direction, and thus it is possible to prevent a foreign matter from entering the airbag cover 30G since a portion where the protrusion-permitting opening 35 is to be formed is blocked by the tip end 31*aa* of the front side portion 31*a* and the tip end 31*ba* of the rear side portion 31*b* overlapping each other in the up-down direction.

In the airbag device 9G according to the second embodiment, the inflator 14 is accommodated in the airbag 10 in a folded state, and includes the attachment fixtures 17 that protrude from the airbag 10 in a folded state and are to be fastened to the attachment base 20, and the ceiling wall portion 41G includes the insertion holes 41*a* through which the attachment fixtures 17 are inserted. Further, the airbag cover 30G includes the compressed portion 45 at which the sheet member 50G is compressed so as to reduce a thickness dimension thereof, and an uncompressed portion 46 that is not compressed, and among the door disposition wall portion 31G, the front and rear side wall portions 38F and 38B and the ceiling wall portion 41G, at least the ceiling wall portion. 41G is provided at a portion of the compressed portion 45.

Therefore, in the second embodiment, even when the side wall portions 31G, 38 (F, B) and 41G of the airbag cover 30G are pushed by the airbag 10 that inflates, and a strong tensile force acts on a peripheral edge of each insertion hole 41*a* in the ceiling wall portion 41G of the airbag cover 30G through which the attachment fixture 17 is inserted, the ceiling wall portion 41G can be stably assembled to the attachment base 20, without breakage of the peripheral edge of the insertion hole 41*a*.

Figure 15:
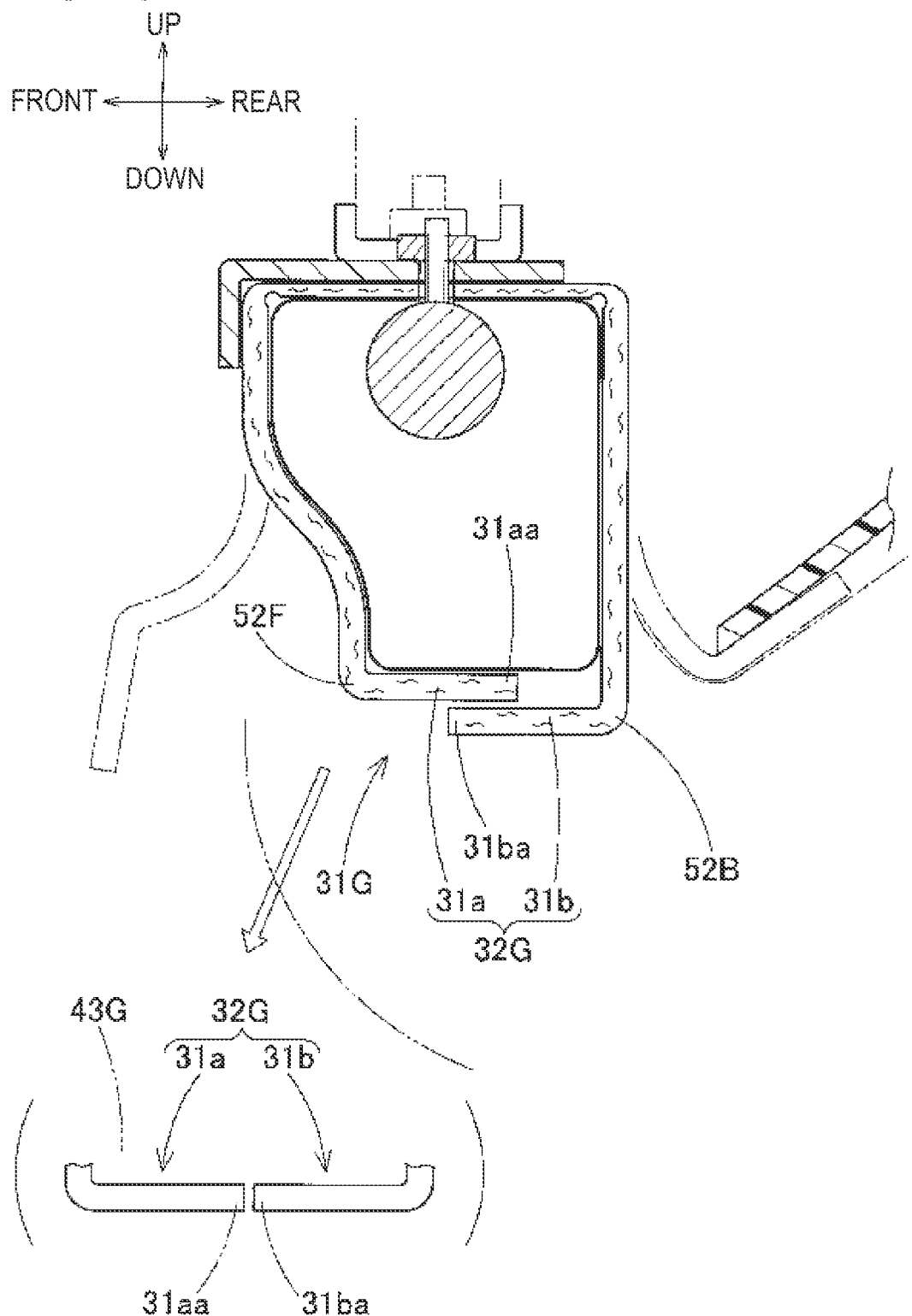
FIG. 15 is a schematic longitudinal cross-sectional view of a modification of the airbag device according to the second embodiment.

In the second embodiment, the door portion 32G of the door disposition wall portion 31G is configured with the front side portion 31*a* being disposed below the rear side portion 31*b*, and alternatively the front side portion 31*a* may be disposed above the rear side portion 31*b* as illustrated in FIG. 15. Further, as long as entry of a foreign matter into the accommodating recess 43G can be prevented, the front side portion 31*a* and the rear side portion 31*b* may be arranged in a butting state where the tip ends 31*aa* and 31*ba* thereof do not overlap each other in the up-down direction, as illustrated in parentheses in FIG. 15. In this case, as long as the entry of a foreign matter into the accommodating recess 43G can be prevented, a slight gap may be allowed between the tip ends 31*aa* and 31*ba*.

Figure 29:
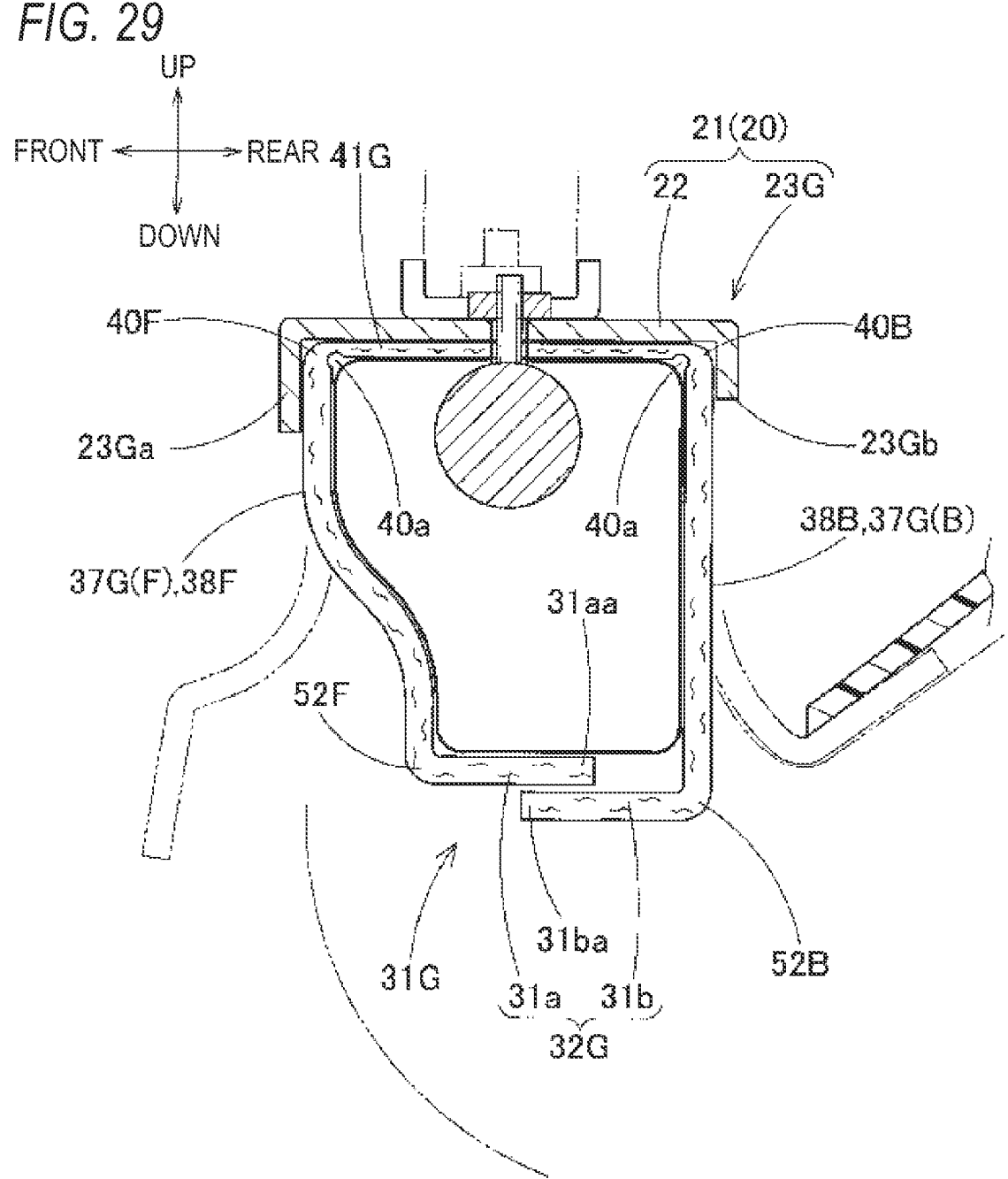
FIG. 29 is a schematic longitudinal cross-sectional view of another modification of the airbag device according to the third embodiment.

Further, in a case where it is hard for the bent portions 40B and 40F, which are bent so that the wall portions on both sides of the recessed groove 40*a* (wall portions 41G and 38F, and wall portions 41G and 38B) are brought close to each other, to maintain the bent state and the door portion 32G may be opened, a configuration as illustrated in FIG. 29 may be adopted. That is, for example, a side wall portion 23G of the attachment base 20 is used to prevent opening of both lower ends of the side wall portions 38F and 38B. In the attachment base 20, side wall portions 23Ga and 23Gb are disposed so as to extend downward from both front and rear edges of the upper wall portion 22 of the body portion 21. The side wall portions 23Ga and 23Gb regulate positions of outer peripheral portions of upper ends of the side wall portions 38F and 38B so that the outer peripheral portions of the upper ends of the side wall portions 38F and 38B do not separate from each other.

Figure 16:
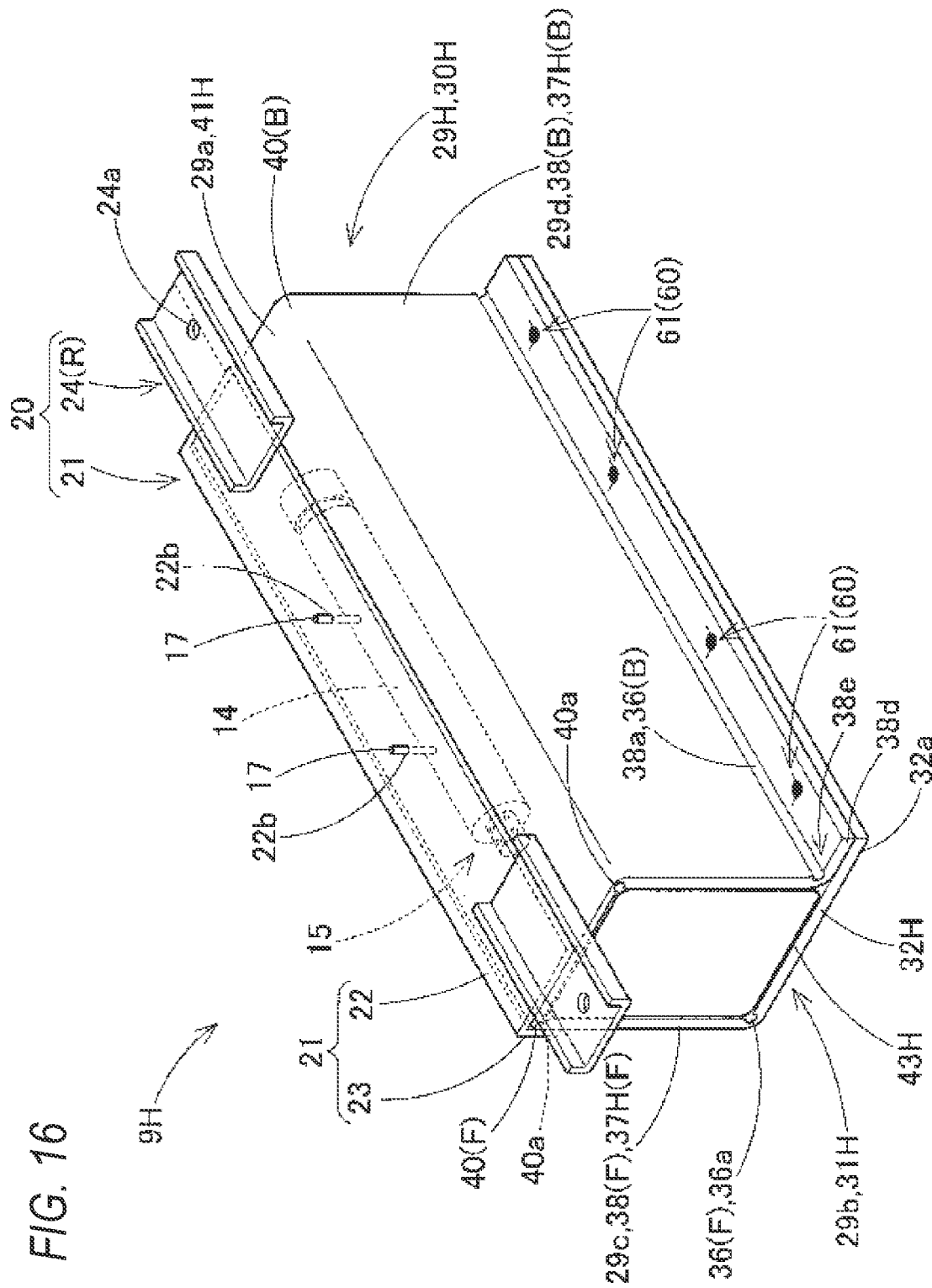
FIG. 16 is a schematic perspective view of an airbag device according to a third embodiment.
Figure 17:
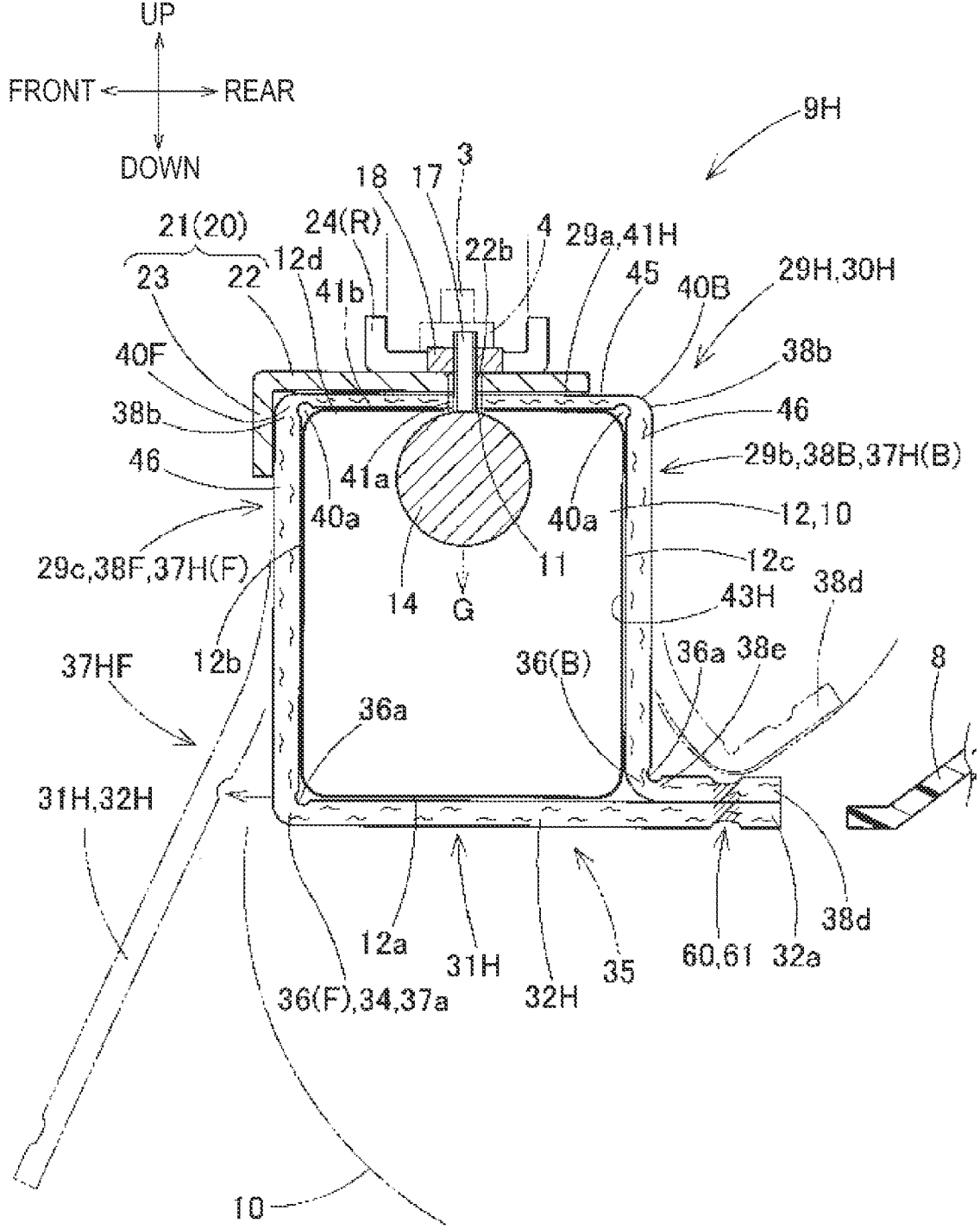
FIG. 17 is a schematic longitudinal cross-sectional view of the airbag device according to the third embodiment.

Next, a knee protection airbag device 9H illustrated in FIGS. 16 and 17 according to a third embodiment will be described. The airbag device 9H is configured to include the airbag 10, the inflator 14, and the attachment base 20 similar to those in the first embodiment, and an airbag cover 30H is configured to be different from the airbag cover 30 of the first embodiment in the following manner. The same members and parts as those in the first embodiment are denoted by the same reference signs as those in the first embodiment, and a description thereof is omitted as appropriate.

Similarly to the first embodiment, the airbag cover 30H is also formed by bending portions of the recessed grooves 36a and 40a for the bent portions 36 and 40, which are formed by performing press working on a sheet member 50H made of a non-woven fabric, and further, predetermined portions thereof are joined by a separable joining member 60.

Specifically, in the airbag cover 30H, front and rear connecting wall portions 37H (F, B) include the side wall portions 38 (F, B) extending upward from front and rear edge sides of a door disposition wall portion 31H, and a ceiling wall portion 41H that faces the door disposition wall portion 31H and that is formed by connecting the upper ends 38b of the front and rear side wall portions 38 (F, B). In the ceiling wall portion 41H, the insertion hole 41a for inserting the attachment fixture 17 extending from the inflator 14 is formed.

The door disposition wall portion 31H, the front and rear side wall portions 38F and 38B, and the ceiling wall portion 41H form an accommodating recess 43H having a substantially rectangular tubular shape for accommodating the airbag 10, and around the accommodating recess 43H, the bent portions 36 (F, B) and 40 (F, B) formed by bending portions of the recessed grooves 36a and 40a for bending are provided. A door portion 32H of the door disposition wall portion 31H of the airbag cover 39H is disposed so as to extend forward from a lower end 37a of the side wall portion 38F, and is joined to an edge 38d of the side wall portion 38B by the separable joining member 60, which is adjacent to a tip end edge (rear end edge) 32a of the door portion 32H and which is bent rearward. When pushed by the airbag 10 that inflates, the joining member 60 releases the joining, whereby the door portion 32H is pushed open, with a portion in the vicinity of the lower end 37a of the side wall portion 38F (in the vicinity of the bent portion 36F) serving as a hinge portion 34, and the protrusion-permitting opening 35 is formed.

In the case of the third embodiment, the joining member 60 is formed by overlapping and thermal welding the edge (joining edge) 32a of the door portion 32H that extends rearward, and the edge (joining edge) 38d of the side wall portion 38B that is adjacent to the edge 32a and that extends rearward.

Figure 18:
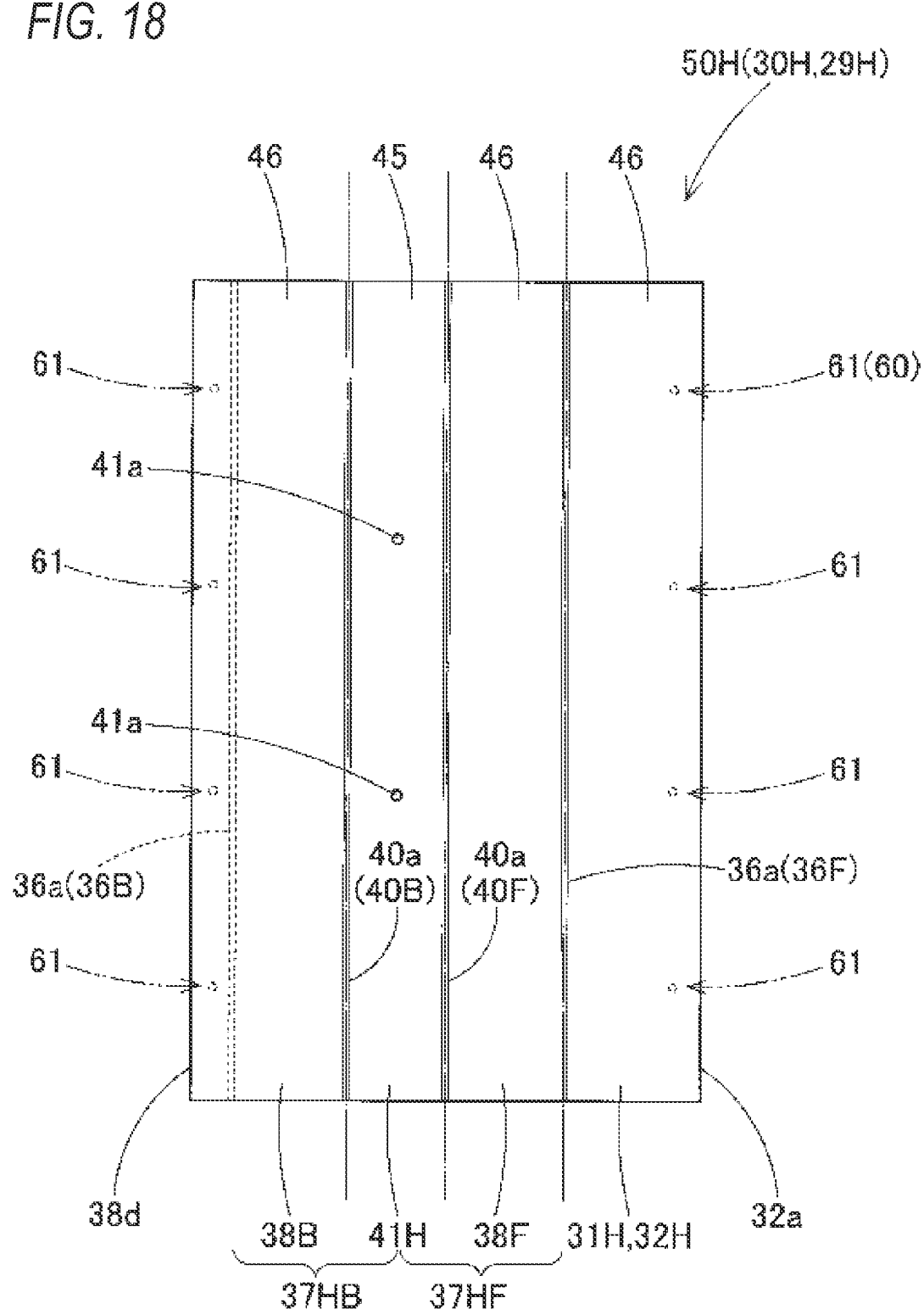
FIG. 18 is a diagram illustrating a sheet member subjected to press working for forming an airbag cover according to the third embodiment.

As illustrated in FIG. 18, the sheet member 50H forming the airbag cover 30H is formed by performing press working on a sheet member made of a non-woven fabric similar to that of the first embodiment, and the compressed portion 45 and the insertion holes 41a are formed in a portion of the ceiling wall portion 41H, and the recessed grooves 40a for bending are formed in the vicinity of both front and rear edges of the ceiling wall portion 41H respectively. The recessed grooves 36a for bending are formed at an intersection of the side wall portion 38F with the door disposition wall portion 31H and in the vicinity of a base portion 38e of the joining edge 38d of the side wall portion 38B respectively.

An assembly operation of the airbag device 9H according to the third embodiment will be described. Similarly to the first embodiment, first, the inflator 14 is accommodated in the airbag 10 such that the attachment fixtures 17 protrude therefrom, further the airbag 10 is folded to form the folded body 12, and the ceiling surface 12d of the folded body 12 is brought into contact with the lower surface 41b of the ceiling wall portion 41H while inserting the attachment fixtures 17 extending from the inflator 14 into the insertion holes 41a in the ceiling wall portion 41H of the airbag cover 30H. Next, portions of the front and rear recessed grooves 40a are bent to form the bent portions 40F and 40B respectively, and the side wall portions 38F and 38B are brought into contact with the side surfaces 12b and 12c of the folded body 12 respectively. Further, portions of the front and rear recessed grooves 36a are bent to form the bent portions 36F and 36B respectively, and the joining edge 38d of the side wall portion 38B is disposed on the joining edge 32a at the tip end of the door portion 32H of the door disposition wall portion 31H so as to overlap each other, and the joining edge 38d and the joining edge 32a are subjected to thermal welding at a plurality of portions to form a welded portion 61. In this way, a box-shaped bag cover body 29H formed of the airbag cover 30H and having a substantially rectangular tubular shape can be formed, and the folded body obtained by folding the airbag 10 can be wrapped while preventing collapsing of the airbag 10.

Thereafter, by inserting each attachment fixture 17 into the through hole 22b of the attachment base 20 and fastening the nut 18 to each attachment fixture 17, the airbag device 9H can be assembled. Further, after the airbag device 9H is assembled, an actuation signal line (not shown) extending from the inflator 14 is connected to a predetermined connector, and the attachment bracket portions 24 (L, R) of the attachment base 20 can be attached to the bracket 2 on the body 1 side by using the bolts 3 and the nuts 4. In this way, the airbag device 9H can be mounted on a predetermined mounting portion below the glove box 7 (see FIG. 1).

When the inflator 14 is actuated after the airbag device 9H is mounted, the inflation gas G is discharged from the gas discharge port 15 (see FIG. 2), and the airbag 10 is deployed and inflated. The welded portion 61 formed by thermal welding and serving as the joining member 60 is pushed by the airbag 10 that inflates, and releases the joining. The door portion 32H is pushed open, with the portion in the vicinity of the bent portion 36F at a front edge side thereof serving as the hinge portion 34, and the protrusion-permitting opening 35 can be formed. The inflated airbag 10 is finally disposed on the front side of the knees of an occupant in the front passenger seat through the protrusion-permitting opening 35.

Also in the airbag device 9H according to the third embodiment, by subjecting the sheet member 50H made of a non-woven fabric to press working, the airbag cover 30H is provided with the recessed grooves 36a and 40a for the bent portions 36 and 40. Further, the sheet member 50H subjected to the press working is bent by using the recessed grooves 36a and 40a such that wall portions on both sides of each of the recessed grooves 36a and 40a (specifically, wall portions 31H and 38H, wall portions 38B and 38d, wall portions 41H and 38F, and wall portions 41H and 38B) are brought close to each other (substantially orthogonal to each other), thereby forming the predetermined bent portions 36 (F, B) and 40 (F, B). Further, the joining edges 32a and 38d overlapping each other are joined. In this way, the airbag cover 30H can be formed, including: the door disposition wall portion 31H having the door portion 32H that allows forming of the protrusion-permitting opening 35; and the connecting wall portions 37H that include the side wall portions 38 (F, B) extending upward from the front and rear edges of the door disposition wall portion 31H and the ceiling wall portion 41H. In addition, the airbag cover 30H can define the box-shaped accommodating recess 43H capable of accommodating the airbag 10. Therefore, operations and effects similar to those of the first embodiment can be obtained.

Further, in the third embodiment, although the door portion 32H of the door disposition wall portion 31H is not provided with a breakage-expected portion at a peripheral edge thereof, when the door portion 32H is pushed by the airbag 10, the welded portion 61, which serves as the joining member 60 joining the door disposition wall portion 31H and the adjacent side wall portion 38B and which is formed by welding, releases the joining so that the protrusion-permitting opening 35 can be formed. Further, in such a configuration, since the breakage-expected portion in which the fibers are cut intermittently is not provided, it is not necessary to manage a length, a pitch, and the like for a cut portion, and the door portion 32H of the door disposition wall portion 31H can be easily provided.

Also in the airbag device 9H according to the third embodiment, the airbag cover 30H includes the compressed portion 45, at which the sheet member 50H is compressed so as to reduce a thickness dimension thereof, and the uncompressed portion 46 that is not compressed, and the ceiling wall portion 41H is provided at a portion of the compressed portion 45. Therefore, at the time the airbag 10 inflates, even if a strong tensile force acts on a peripheral edge of each insertion hole 41a in the ceiling wall portion 41H of the airbag cover 30H through which the attachment fixture 17 is inserted, the ceiling wall portion 41H can be stably assembled to the attachment base 20 without breakage of the peripheral edge of the insertion hole 41a.

Figure 19:
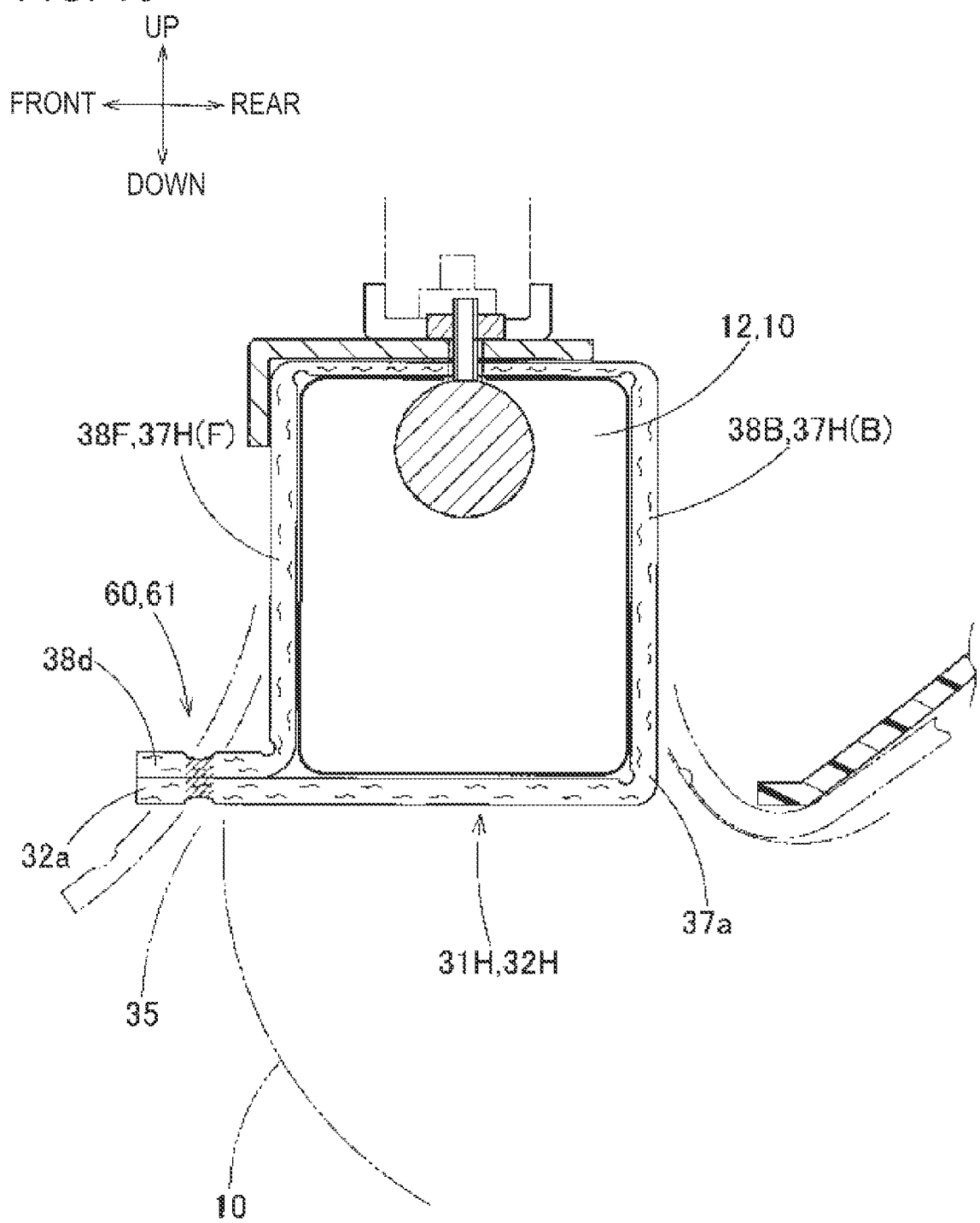
FIG. 19 is a schematic longitudinal cross-sectional view of a modification of the airbag device according to the third embodiment.

In the third embodiment, the joining edge 38d is provided in the rear side wall portion 38B, and the joining edge 32a at a rear edge side of the door disposition wall portion 31H is joined to the joining edge 38d. Alternatively, as illustrated in FIG. 19, the door disposition wall portion 31H may be disposed so as to extend forward from a lower end 37a of the rear side wall portion 38B, the joining edge 38d bent forward may be provided in the front side wall portion 38F, and the joining edge 32a at a front edge side of the door portion 32H of the door disposition wall portion 31H may be joined to the joining edge 38d.

Figure 20:
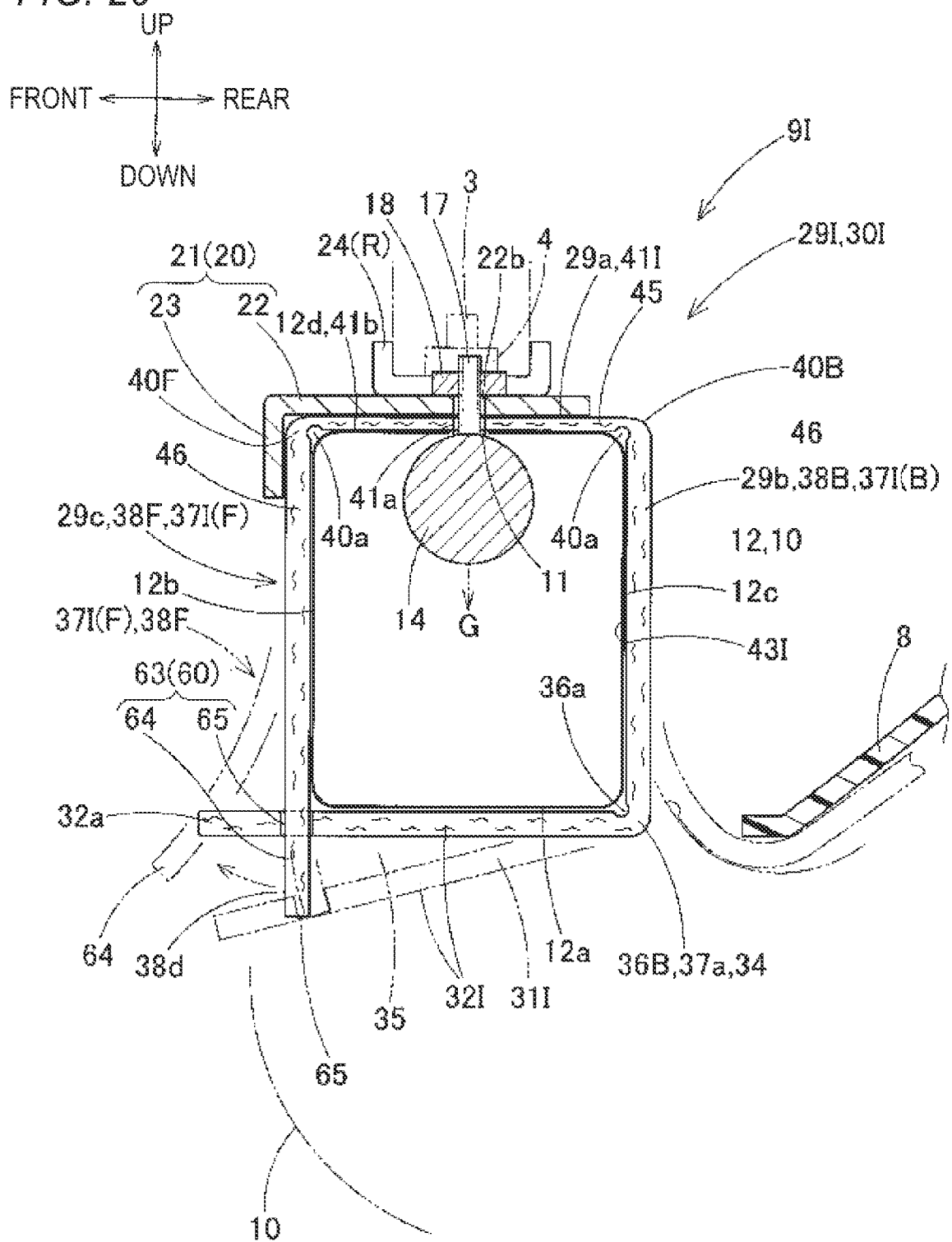
FIG. 20 is a schematic longitudinal cross-sectional view of an airbag device according to a fourth embodiment.
Figure 21:
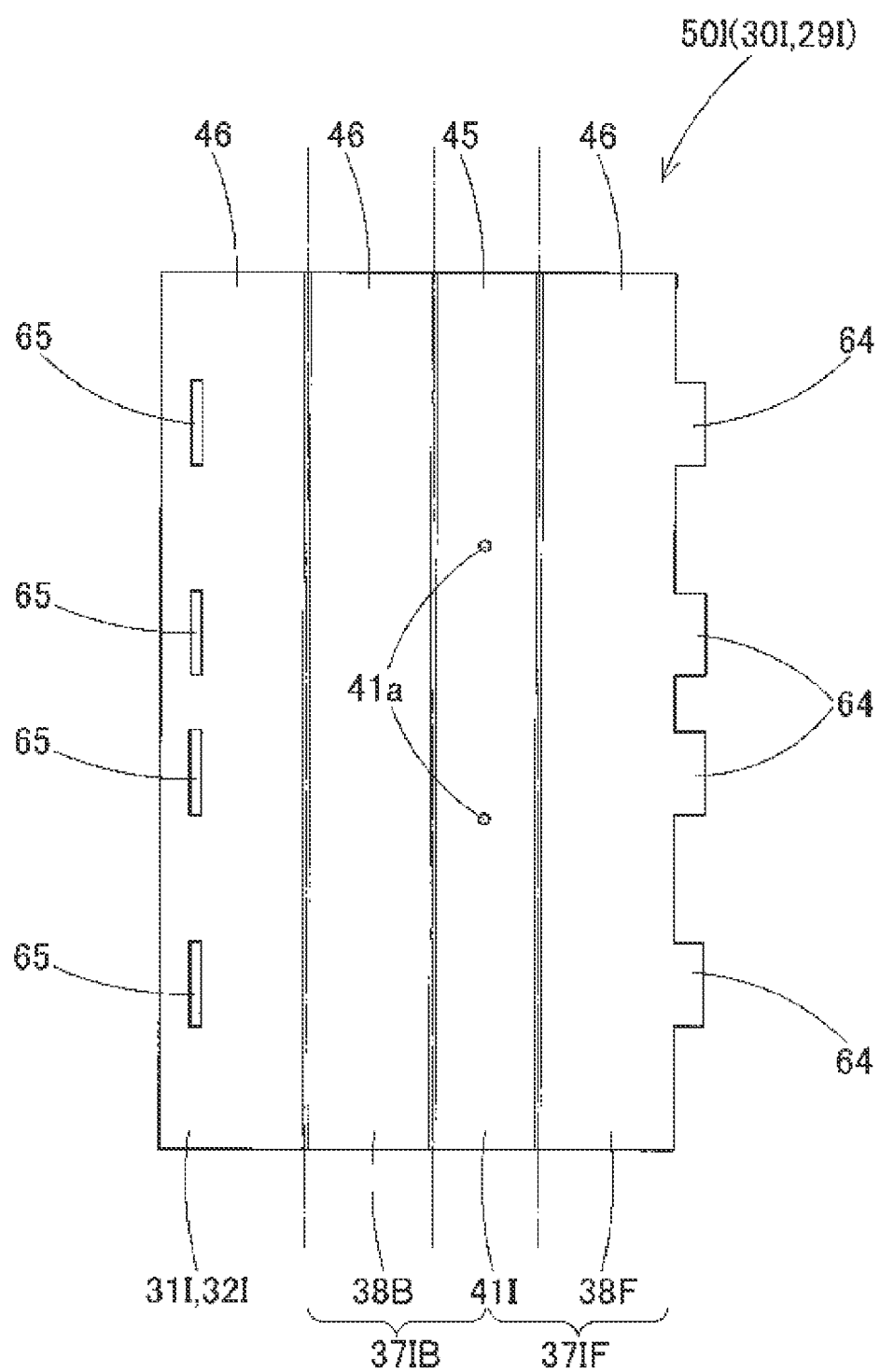
FIG. 21 is a diagram illustrating a sheet member subjected to press working for forming an airbag cover according to the fourth embodiment.

Further, as in a knee protection airbag device 9I illustrated in FIGS. 20 and 21 according to a fourth embodiment, a fitting structure 63 may be provided, as joining members 60 that correspond to each other, at the joining edge 32a at a tip end of a door portion 32I of a door disposition wall portion 31I and at the joining edge 38d at a lower end of the side wall portion 38F. The door disposition wall portion 31I is disposed so as to extend forward from the lower end 37a of the rear side wall portion 38B. The fitting structure 63 is formed of a fitting protrusion 64 and a fitting hole 65 for fitting the fitting protrusion 64 that are fitted with each other in a separable manner. The fitting hole 65 is provided at the joining edge 32a at the tip end of the door portion 32I of the door disposition wall portion 31I, and the joining edge 38d extending linearly at the lower end of the side wall portion 38F is provided as the fitting protrusion 64.

Specifically, on a sheet member 50I made of a non-woven fabric, similarly to the third embodiment, by press working, the recessed grooves 36a and 40a for the bent portions 36 and 40 are formed and further a predetermined number of fitting protrusions 64 and the fitting holes 65 are formed, and then the sheet member 50I is cut in a predetermined shape to form an airbag cover 30I. The compressed portion 45 and the insertion holes 41a are formed in a portion of a ceiling wall portion 41I.

An assembly operation of the airbag device 9I according to the fourth embodiment will be described. Similarly to the first embodiment, first, the inflator 14 is accommodated in the airbag 10 such that the attachment fixtures 17 protrude therefrom, further the airbag 10 is folded to form the folded body 12, and the ceiling surface 12d of the folded body 12 is brought into contact with the lower surface 41b of the ceiling wall portion 41I while inserting the attachment fixtures 17 extending from the inflator 14 into the insertion holes 41a in the ceiling wall portion 41I of the airbag cover 30I. Next, portions of the front and rear recessed grooves 40a are bent so that wall portions on both sides of each recessed groove 40a (wall portions 38F and 41I, and wall portions 41I and 38B) are brought close to each other (substantially orthogonal to each other), thereby forming the bent portions 40F and 40B, and the side wall portions 38F and 38B are brought into contact with the side surfaces 12b and 12c of the folded body 12 respectively. Further, a portion of the recessed groove 36a at a rear side is bent so that wall portions 38B and 31I on both sides thereof are brought close to each other (substantially orthogonal to each other), thereby forming the bent portion 36B, and the fitting protrusion 64 is fitted with the fitting hole 65 correspondingly. In this way, a box-shaped bag cover body 29I having a substantially rectangular tubular shape and formed of the airbag cover 30I can be formed, and the folded body 12 obtained by folding the airbag 10 can be wrapped while preventing collapsing of the airbag 10.

Thereafter, by inserting each attachment fixture 17 into the through hole 22b of the attachment base 20 and fastening the nut 18 to each attachment fixture 17, the airbag device 9I can be assembled. Further, after the airbag device 9I is assembled, an actuation signal line (not shown) extending from the inflator 14 is connected to a predetermined connector, and the attachment bracket portions 24 (L, R) of the attachment base 20 can be attached to the bracket 2 on the body 1 side by using the bolts 3 and the nuts 4. In this way, the airbag device 9I can be mounted on a predetermined mounting portion below the glove box 7 (see FIG. 1).

When the inflator 14 is actuated after the airbag device 9I is mounted, the inflation gas G is discharged from the gas discharge port 15 (see FIG. 2), and the airbag 10 is deployed and inflated. When pushed by the airbag 10 that inflates, the fitting protrusion 64 in the fitting structure 63 serving as the joining member 60 is detached from the fitting hole 65, and joining of the fitting structure 63 is released. The door portion 32I is pushed open, with a portion in the vicinity of the rear bent portion 36B serving as the hinge portion 34, and the protrusion-permitting opening 35 can be formed. The inflated airbag 10 is finally disposed on the front side of the knees of an occupant in the front passenger seat through the protrusion-permitting opening 35.

Also in the airbag device 9I according to the fourth embodiment, by subjecting the sheet member 50I made of a non-woven fabric to press working, the airbag cover 30I is provided with the recessed grooves 36a and 40a for the bent portions 36 and 40, the fitting protrusion 64 and the fitting hole 65. Further, the sheet member 50I subjected to the press working is bent by using the recessed grooves 36a and 40a to form the predetermined bent portions 36B and 40 (F, B), and the fitting protrusion 64 is fitted with the fitting hole 65 so that the overlapped joining edges 32a and 38d are joined to each other. In this way, the airbag cover 30I can be formed, including: the door disposition wall portion 31I having the door portion 32I that allows forming of the protrusion-permitting opening 35; and connecting wall portions 37I that include the side wall portions 38 (F, B)

extending upward from front and rear edges of the door disposition wall portion 31I and the ceiling wall portion 41I. In addition, the airbag cover 30I can define a box-shaped accommodating recess 43I capable of accommodating the airbag 10. Therefore, operations and effects similar to those of the first embodiment can be obtained.

Further, in the fourth embodiment, although the door portion 32I of the door disposition wall portion 31I is not provided with a breakage-expected portion at a peripheral edge thereof, when the door portion 32I is pushed by the airbag 10, the fitting structure 63, which serves as the joining member 60 joining the door disposition wall portion 31I and the adjacent side wall portion 38F, releases the joining so that the protrusion-permitting opening 35 can be formed. Further, in such a configuration, since the breakage-expected portion in which the fibers are cut intermittently is not provided, it is not necessary to manage a length, a pitch, and the like for a cut portion, and the door portion 32I of the door disposition wall portion 31I can be easily provided.

Also in the airbag device 9I according to the fourth embodiment, the airbag cover 30I includes the compressed portion 45, at which the sheet member 50I is compressed so as to reduce a thickness dimension thereof, and the uncompressed portion 46 that is not compressed, and the ceiling wall portion 41I is provided at a portion of the compressed portion 45. Therefore, at the time the airbag 10 inflates, even if a strong tensile force acts on a peripheral edge of each insertion hole 41a in the ceiling wall portion 41I of the airbag cover 30I through which the attachment fixture 17 is inserted, the ceiling wall portion 41I can be stably assembled to the attachment base 20 without breakage of the peripheral edge of the insertion hole 41a.

Figure 22:
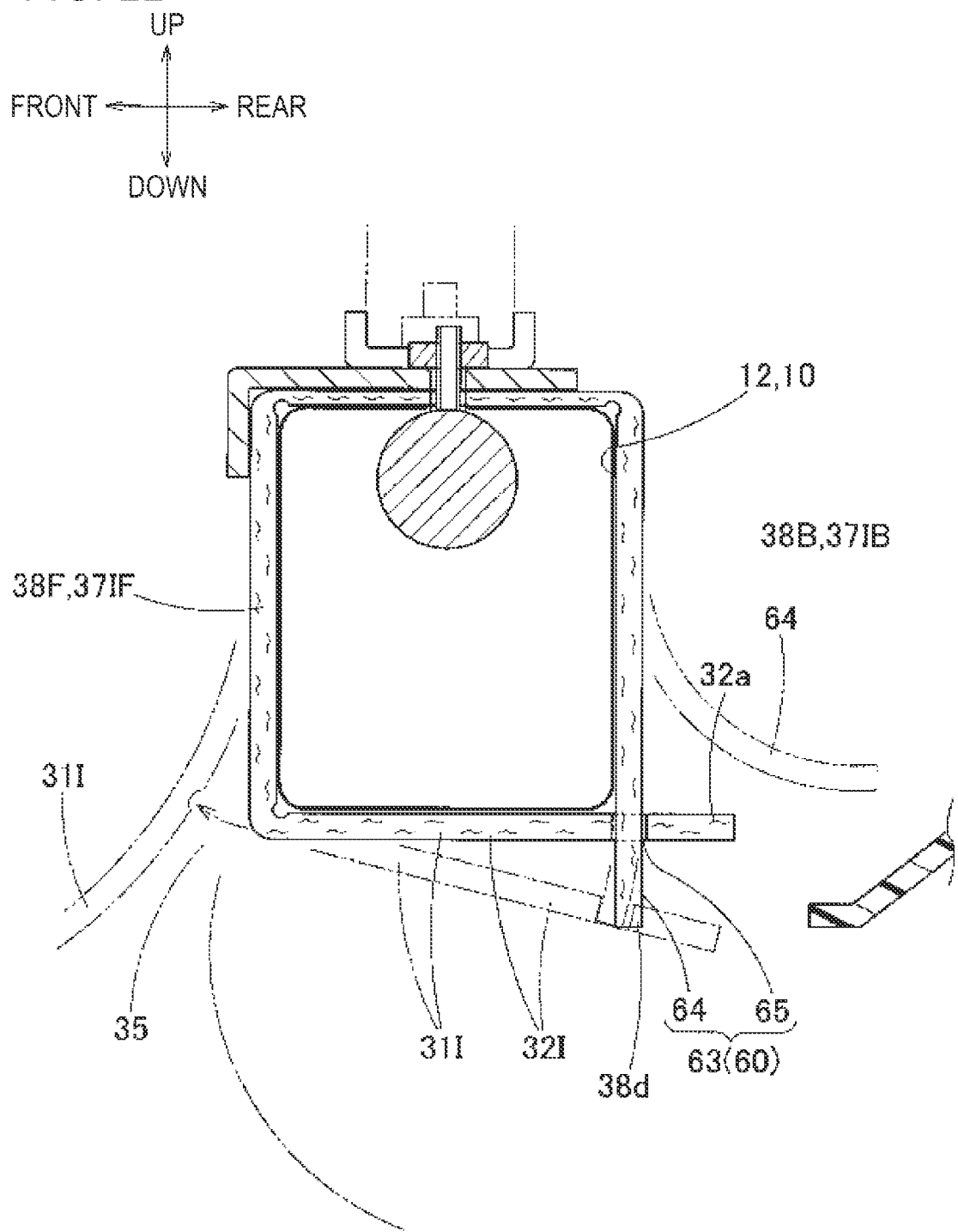
FIG. 22 is a schematic longitudinal cross-sectional view of a modification of the airbag device according to the fourth embodiment.

In the fourth embodiment, the joining edge 38d provided with the fitting protrusion 64 is provided in the front side wall portion 38F, and the fitting hole 65 is provided in the joining edge 32a at a front edge side of the door disposition wall portion 31I. Alternatively, as illustrated in FIG. 22, the front and the rear may be reversed, that is, the joining edge 38d provided with the fitting protrusion 64 may be provided in the rear side wall portion 38B, and the fitting hole 65 may be provided in the joining edge 32a at a rear edge side of the door disposition wall portion 31I.

Figure 23:
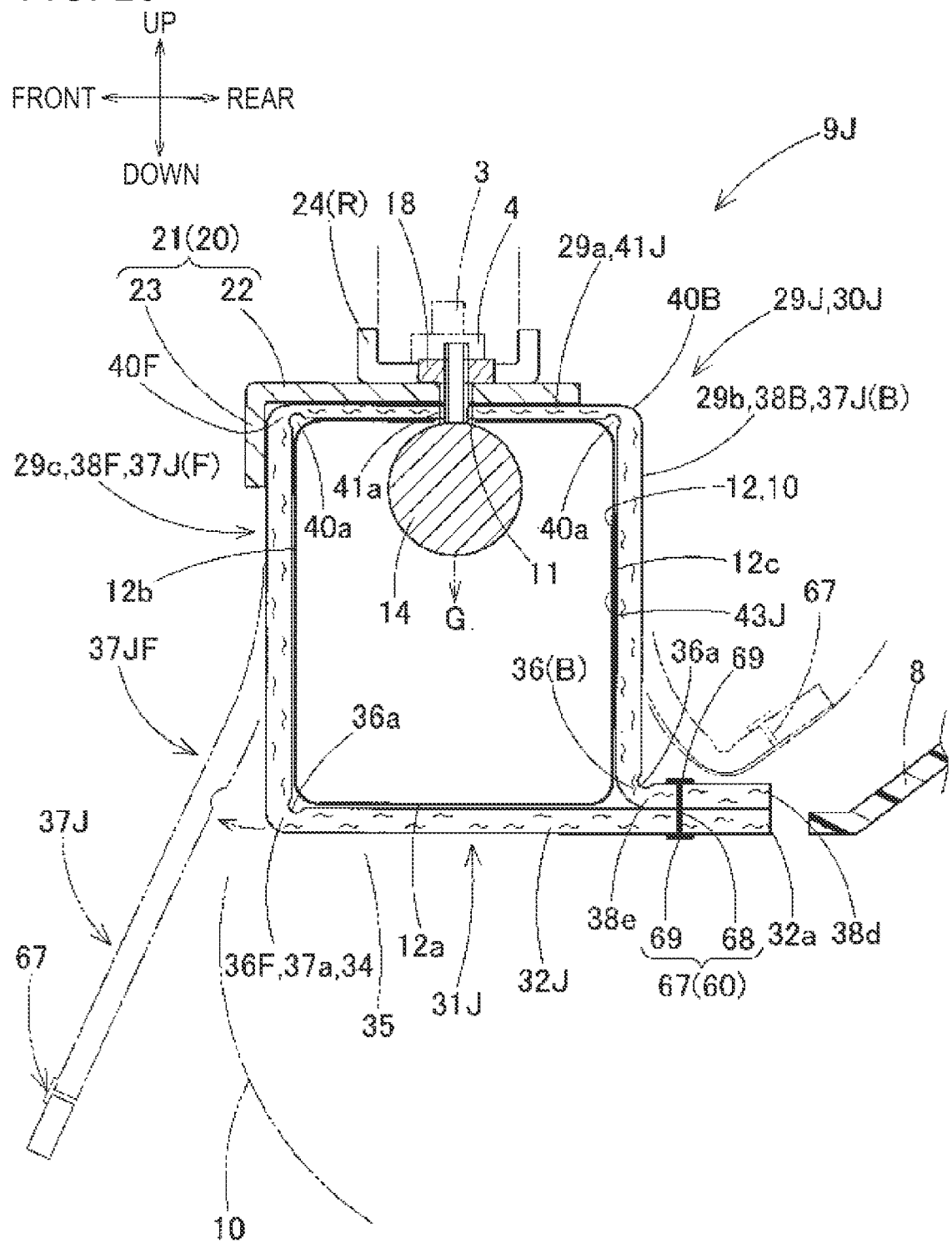
FIG. 23 is a schematic longitudinal cross-sectional view of an airbag device according to a fifth embodiment.

In addition, as in a knee protection airbag device 9J illustrated in FIG. 23 according to a fifth embodiment, the joining edge 32a at a tip end of a door portion 32J of a door disposition wall portion 31J that extends rearward from the lower end 37a of the front side wall portion 38F, and the joining edge 38d at a lower end of the side wall portion 38B that is bent backward may be joined by a tag pin 67 as the joining member 60. The tag pin 67 is made of a synthetic resin such as polyamide, and includes a shaft portion 68 that penetrates the joining edge 32a at the tip end of the door portion 32J and the adjacent joining edge 38d of the side wall portion 38B in an overlapped state, and locking heads 69 and 69 that extend in an orthogonal direction from the shaft portion 68 so as to press peripheries of the penetrated joining edges 32a and 38d at both ends of the shaft portion 68, each locking head 69 and the shaft portion 68 presenting a T shape. In the tag pin 67, when the airbag 10 is inflated after the joining edges 32a and 38d are mounted, at least one of the locking heads 69 and 69 is detached from the joining edges 32a and 38d or is broken with the shaft portion 68, so that the joining edges 32a and 38d are separated.

Figure 24:
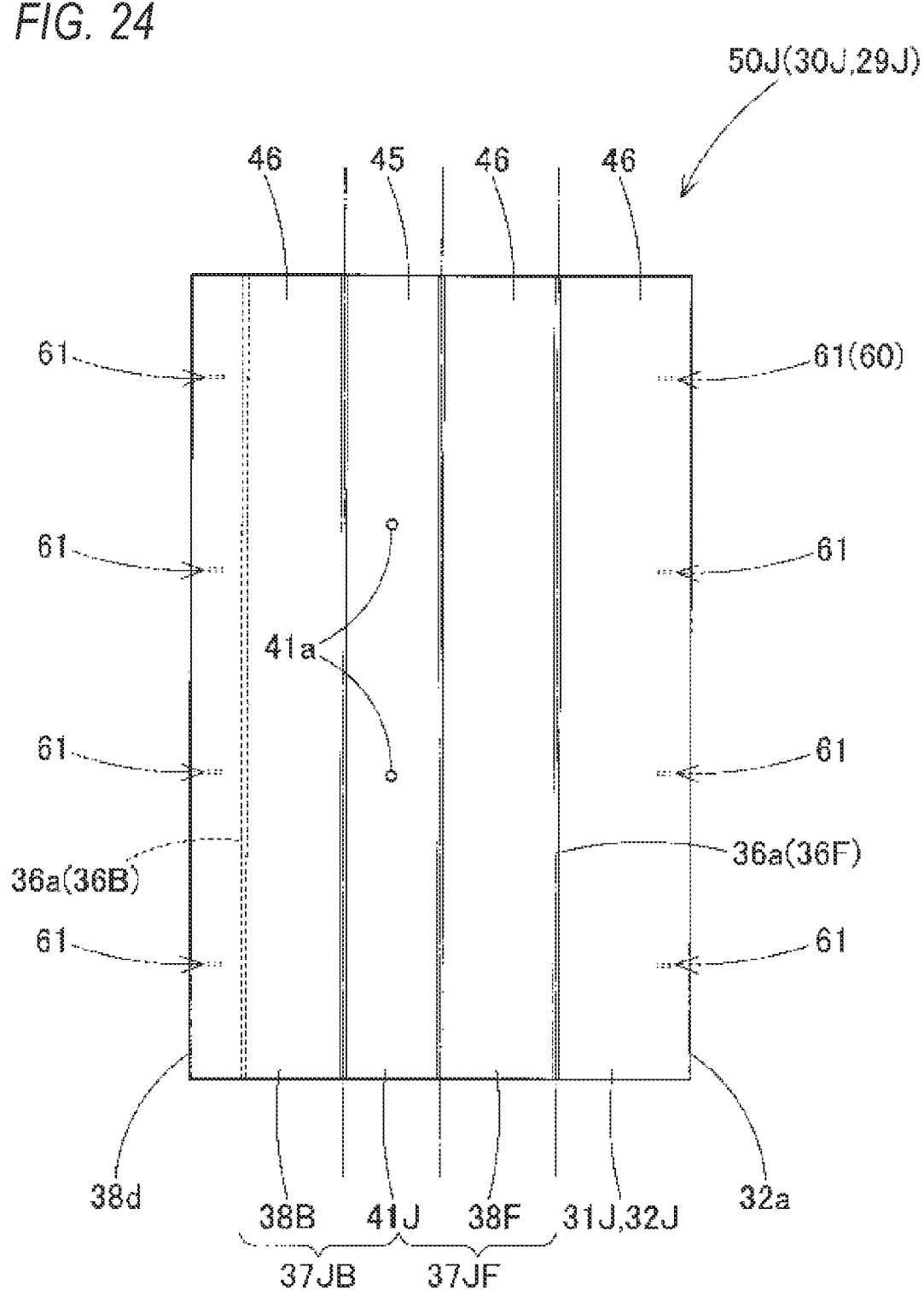
FIG. 24 is a diagram illustrating a sheet member subjected to press working for forming an airbag cover according to the fifth embodiment.

Similarly to the third embodiment, in an airbag cover 30J as illustrated in FIG. 24, by press working, the recessed grooves 36a and 40a are formed on a sheet member 50J made of a non-woven fabric and the compressed portion 45 and the insertion holes 41a are formed in a portion of a ceiling wall portion 41J. The airbag cover 30J is different from that of the third embodiment in that the tag pin 67 is attached as the joining member 60, instead of providing the welded portion 61 as the joining member 60.

Therefore, the airbag device 9J of the fifth embodiment can be assembled similarly to the airbag device 9H of the third embodiment except that the tag pin 67 is attached instead of the welded portion 61.

When the inflator 14 is actuated after the airbag device 9J is mounted on a vehicle, the inflation gas G is discharged from the gas discharge port 15 (see FIG. 2), and the airbag 10 is deployed and inflated. When pushed by the airbag 10 that inflates, the locking head 69 of the tag pin 67 serving as the joining member 60 is detached or the like and the tag pin 67 releases the joining. The door portion 32J is pushed open, with a portion in the vicinity of the bent portion 36F at a front edge side thereof serving as the hinge portion 34, and the protrusion-permitting opening 35 can be formed. The inflated airbag 10 is finally disposed on the front side of the knees of an occupant in the front passenger seat through the protrusion-permitting opening 35.

Also in the airbag device 9J according to the fifth embodiment, similarly to the third embodiment, by subjecting the sheet member 50J made of a non-woven fabric to press working, the airbag cover 30J is provided with the recessed grooves 36a and 40a for the bent portions 36 and 40. Further, the sheet member 50J subjected to the press working is bent by using the recessed grooves 36a and 40a to form the predetermined bent portions 36 (F, B) and 40 (F, B), and the overlapped joining edge 32a and 38d are joined to each other by the tag pin 67. In this way, the airbag cover 30J (airbag cover body 29J) can be formed, including: the door disposition wall portion 31J having the door portion 32J that allows forming of the protrusion-permitting opening 35; and connecting wall portions 37J that include the side wall portions 38 (F, B) extending upward from front and rear edges of the door disposition wall portion 31J and a ceiling wall portion 41J. In addition, the airbag cover 30J can define a box-shaped accommodating recess 43J capable of accommodating the airbag 10. Therefore, operations and effects similar to those of the first embodiment can be obtained.

Further, in the fifth embodiment, although the door portion 32J of the door disposition wall portion 31J is not provided with a breakage-expected portion at a peripheral edge thereof, when the door portion 32J is pushed by the airbag 10, the tag pin 67, which serves as the joining member 60 joining the door disposition wall portion 31J and the adjacent side wall portion 38B, releases the joining so that the protrusion-permitting opening 35 can be formed. Further, in such a configuration, since the breakage-expected portion in which the fibers are cut intermittently is not provided, it is not necessary to manage a length, a pitch, and the like for a cut portion, and the door portion 32J of the door disposition wall portion 31J can be easily provided.

Also in the airbag device 9J according to the fifth embodiment, the airbag cover 30J includes the compressed portion 45, at which the sheet member 50J is compressed so as to reduce a thickness dimension thereof, and the uncompressed portion 46 that is not compressed, and the ceiling wall portion 41J is provided at a portion of the compressed portion 45. Therefore, at the time the airbag 10 inflates, even if a strong tensile force acts on a peripheral edge of each insertion hole 41a in the ceiling wall portion 41J of the airbag cover 30J through which the attachment fixture 17 is inserted, the ceiling wall portion 41J can be stably assembled to the attachment base 20 without breakage of the peripheral edge of the insertion hole 41*a*.

Figure 25:
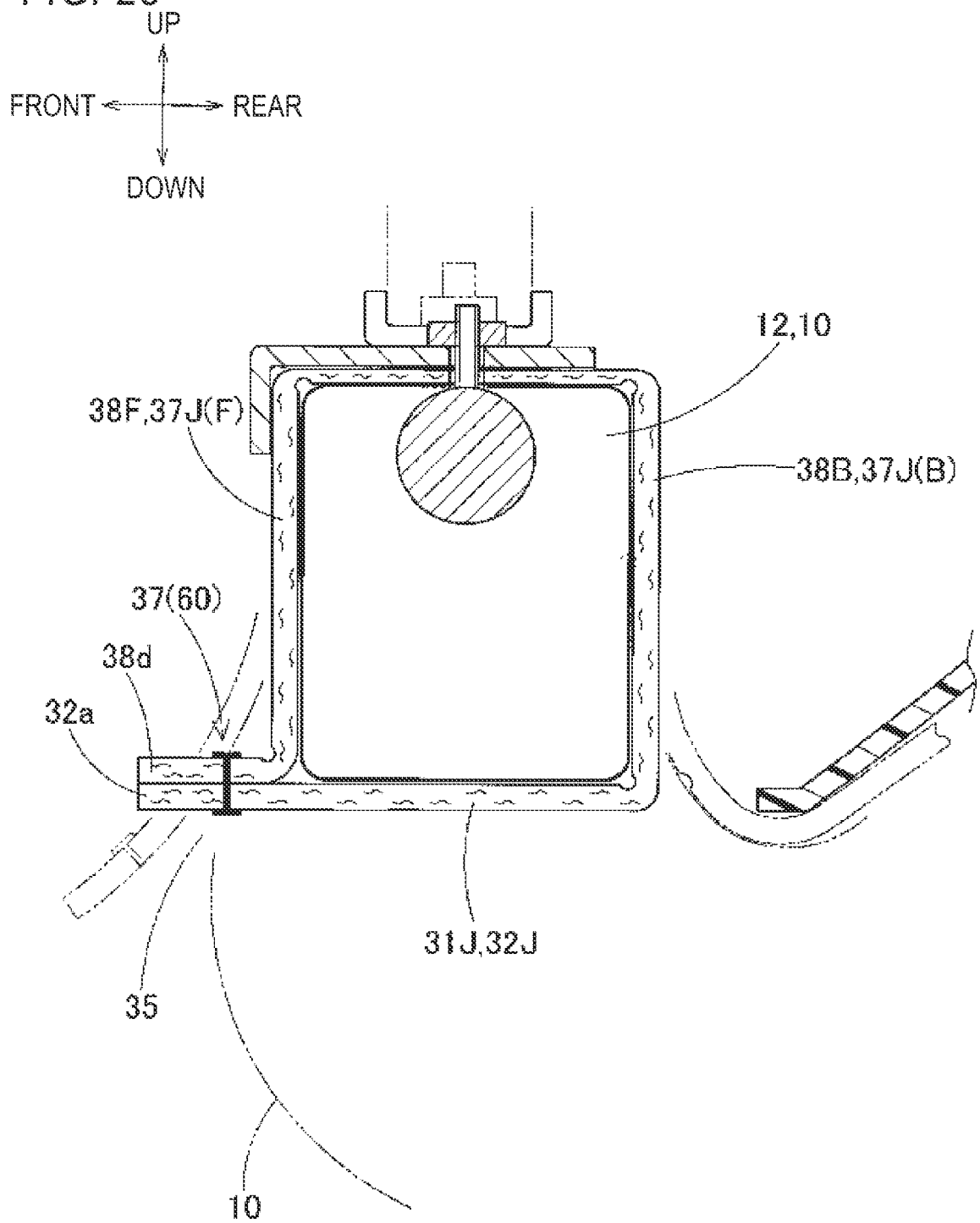
FIG. 25 is a schematic longitudinal cross-sectional view of a modification of the airbag device according to the fifth embodiment.

In the fifth embodiment, the joining edge 38*d* is provided in the rear side wall portion 38B, and the joining edge 32*a* at a rear edge side of the door disposition wall portion 31J is joined to the joining edge 38*d* by the tag pin 67. Alternatively, as illustrated in FIG. 25, the joining edge 38*d* may be provided in the front side wall portion 38F, and the joining edge 32*a* at a front edge side of the door disposition wall portion 31J may be joined to the joining edge 38*d* by using the tag pin 67.

Figure 26:
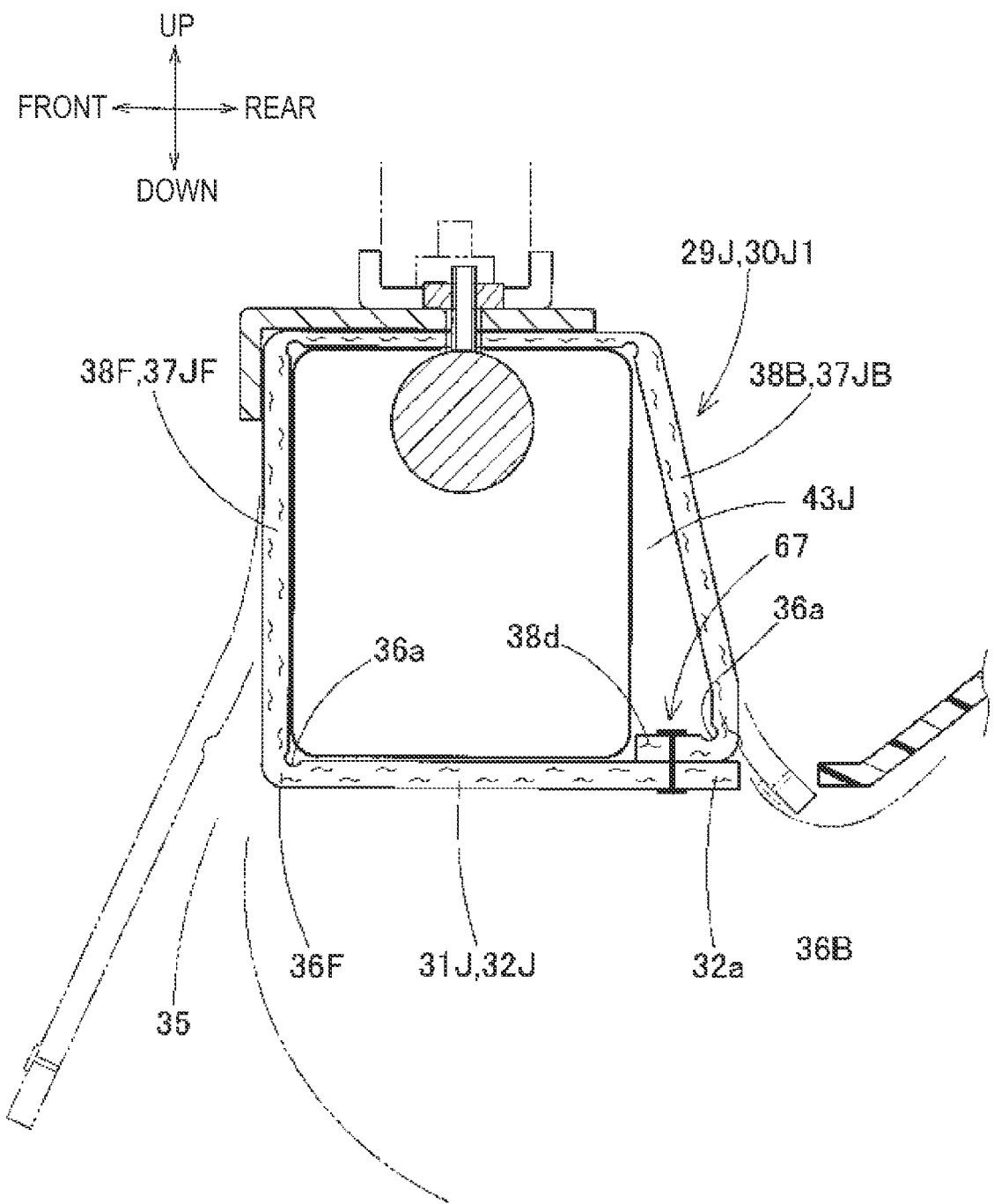
FIG. 26 is a schematic longitudinal cross-sectional view of another modification of the airbag device according to the fifth embodiment.
Figure 27:
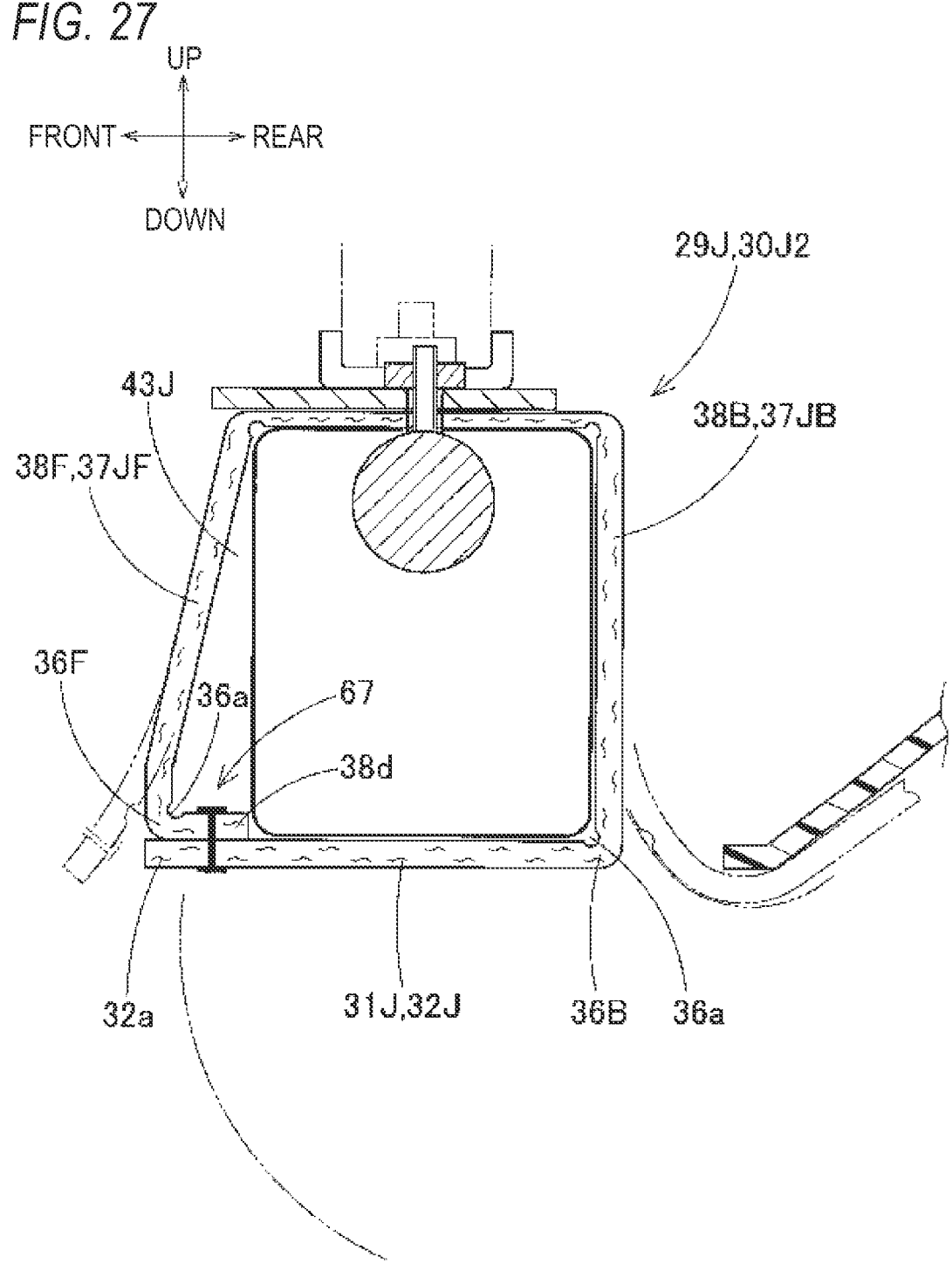
FIG. 27 is a schematic longitudinal cross-sectional view of still another modification of the airbag device according to the fifth embodiment.

In a case of using the tag pin 67, even if both of the joining edges 32*a* and 38*d* are not exposed to an outer surface side, the joining edges 32*a* and 38*d* can be joined to each other from one side of the joining edges 32*a* and 38*d* by using a corresponding tag gun. Therefore, as in an airbag cover 30J1 illustrated in FIG. 26 and an airbag cover 30J2 illustrated in FIG. 27, in an inner peripheral side of the airbag cover body 29J having a substantially rectangular tubular shape, the joining edge 32*a* at a tip end of the door portion 32J of the door disposition wall portion 31J may have a length so as not to protrude from the adjacent side wall portion 38 in the front-rear direction, the joining edge 38*d* of the adjacent side wall portion 38 may be disposed to protrude toward the accommodating recess 43J side, the joining edges 32*a* and 38*d* may be overlapped with each other, and further the joining edges 32*a* and 38*d* may be joined to each other with the tag pin 67 by using a tag gun (not shown) from an outer peripheral side of the airbag cover body 29J.

Figure 28:
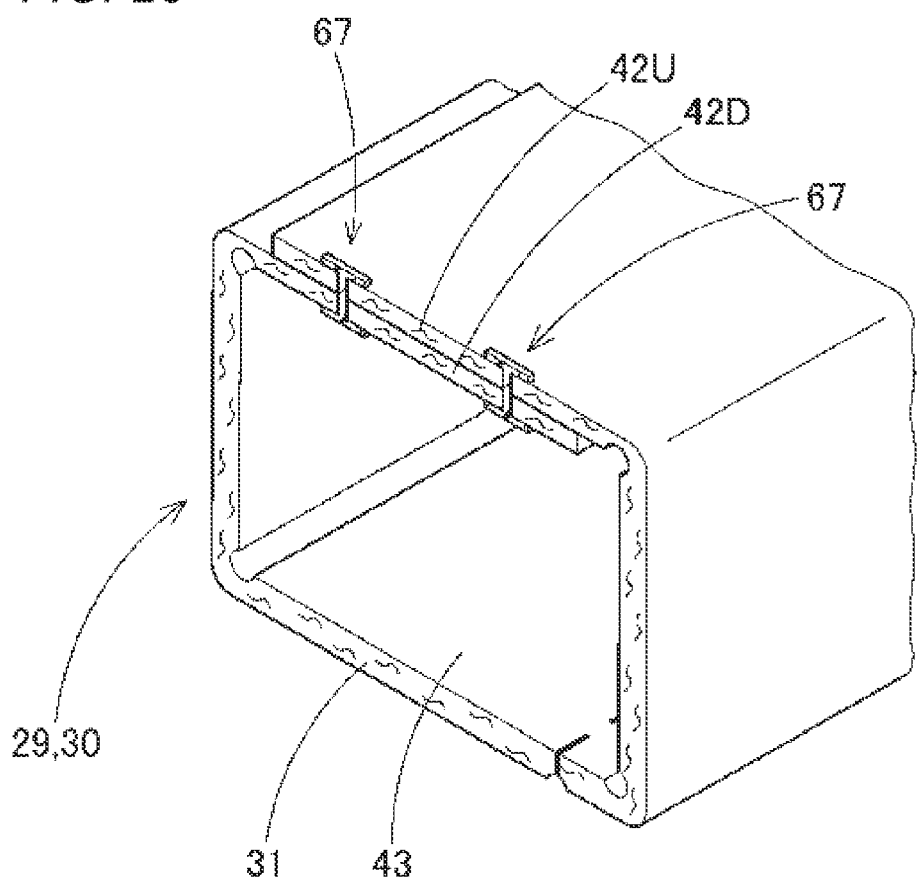
FIG. 28 is a diagram illustrating another example of use of a tag pin.

Further, as illustrated in FIG. 28, such a tag pin 67 may be used to join the overlapped ceiling-constituting wall portions 42 (U, D) of the airbag cover 30 of the first embodiment.

Although the knee protection airbag devices 9, 9G, 9H, 9I, and 9J to be mounted a the front lower side of a front passenger seat are described in the first to fifth embodiments, the present invention can be applied to a knee protection airbag device to be mounted on a front lower side of a seat including a driver's seat in addition to the front passenger seat.

What is claimed is:

1. A knee protection airbag device, comprising:
    an airbag for knee protection that is accommodated in a folded manner;
    an inflator that supplies an inflation gas to the airbag;
    an airbag cover that covers the airbag accommodated in a folded manner and that is capable of forming a protrusion-permitting opening for the airbag when pushed by the airbag that is inflated by the inflation gas; and
    an attachment base that holds the airbag, the inflator, and the airbag cover and that is connected to a vehicle body side member,
    wherein the knee protection airbag device is mounted on a front lower side of a seat, and the airbag in inflation protrudes downward from a mounting portion and thereafter is deployed toward an upper rear side,
    wherein the airbag cover includes:
        a door disposition wall portion having a door portion that covers a lower portion of the airbag in a folded state and that is pushed open by the airbag inflated due to inflow of the inflation gas to allow forming of the protrusion-permitting opening; and
        connecting wall portions extending upward from a front edge and a rear edge of the door disposition wall portion and connected to the attachment base,
    wherein the airbag cover is formed of a sheet member made of a non-woven fabric, and
    wherein the airbag cover includes:
        at least one bent portion that is formed by bending, from a portion of a recessed groove for bending that is formed by performing press working on the sheet member, so that wall portions on both sides of the recessed groove are brought close to each other; and
        an accommodating recess having a box shape and being defined by the at least one bent portion and that is capable of accommodating at least a part of the airbag.

2. The knee protection airbag device according to claim 1, wherein the door portion of the door disposition wall portion of the airbag cover is configured to be opened by breaking a breakage-expected portion at a peripheral edge thereof when the door portion is pushed by the airbag that inflates, and
wherein the breakage-expected portion is formed by intermittently providing a cut portion of a fiber of the non-woven fabric with respect to the sheet member together with the recessed groove.

3. The knee protection airbag device according to claim 2, wherein the connecting wall portions of the airbag cover include side wall portions that extend upward from the front edge and the rear edge of the door disposition wall portion, and ceiling-constituting wall portions that overlap and are connected with each other, from upper ends of the side wall portions, passing through the bent portion formed by bending the portion of the recessed groove for bending, and
wherein with the door disposition wall portion, the side wall portions in front and rear, and the ceiling-constituting wall portions connected with each other, the airbag cover constitutes a bag cover body in a substantially rectangular tubular shape extending in a left-right direction that covers an overall periphery surrounding a front side, a rear side, an upper side and a lower side of the airbag in a folded state, and that defines the accommodating recess for accommodating the airbag.

4. The knee protection airbag device according to claim 3, wherein the inflator is accommodated in the airbag in a folded state, and includes an attachment fixture that protrudes from the airbag in a folded state and that is to be fastened to the attachment base, and
wherein the ceiling-constituting wall portions connected with each other are provided with an insertion hole into which the attachment fixture is to be inserted, and are connected with each other by being locked by the attachment fixture that is inserted into the insertion hole.

5. The knee protection airbag device according to claim 4, wherein the airbag cover is configured to include a compressed portion at which the sheet member is compressed so as to reduce a thickness dimension thereof, and an uncompressed portion that is not compressed, and
wherein among the door disposition wall portion, the side wall portions in front and rear, and the ceiling-constituting wall portions connected with each other, at least the ceiling-constituting wall portions are formed of the compressed portion.

6. The knee protection airbag device according to claim 1, wherein the door disposition wall portion of the airbag cover includes a front side portion and a rear side portion that are formed by extending, from lower ends of the connecting wall portions that are separated in a front-rear direction, so as to approach each other, wherein the door portion includes the front side portion and the rear side portion, and when pushed by the airbag that inflates, the door portion is pushed open so as to separate tip ends of the front side portion and the rear side portion from each other, thereby forming the protrusion-permitting opening, wherein the connecting wall portions in front and rear include side wall portions that extend upward from the front edge and the rear edge of the door disposition wall portion, and a ceiling wall portion that faces the door disposition wall portion and that is formed by connecting upper ends of the side wall portions in front and rear, and wherein the accommodating recess for accommodating the airbag is formed by the door disposition wall portion, the side wall portions in front and rear, and the ceiling wall portion, and the bent portion formed by bending the portion of the recessed groove for bending is provided around the accommodating recess.

7. The knee protection airbag device according to claim 6, wherein the front side portion and the rear side portion of the door disposition wall portion of the airbag cover are disposed such that the tip ends thereof overlap with each other in an up-down direction.

8. The knee protection airbag device according to claim 6, wherein the inflator is accommodated in the airbag in a folded state, and includes an attachment fixture that protrudes from the airbag in a folded state and that is to be fastened to the attachment base, wherein the ceiling wall portion includes an insertion hole through which the attachment fixture is inserted, wherein the airbag cover is configured to include a compressed portion at which the sheet member is compressed so as to reduce a thickness dimension thereof, and an uncompressed portion that is not compressed, and wherein among the door disposition wall portion, the side wall portions in front and rear, and the ceiling wall portion, at least the ceiling wall portion is provided at a portion of the compressed portion.

9. The knee protection airbag device according to claim 1, wherein the connecting wall portions in front and rear include side wall portions that extend upward from the front edge and the rear edge of the door disposition wall portion, and a ceiling wall portion that faces the door disposition wall portion and that is formed by connecting upper ends of the side wall portions in front and rear, wherein the accommodating recess for accommodating the airbag is defined by the door disposition wall portion, the side wall portions in front and rear, and the ceiling wall portion, and the bent portion formed by bending the portion of the recessed groove for bending is provided around the accommodating recess, wherein the door portion of the door disposition wall portion of the airbag cover is joined, by a separable joining member, to an edge portion of the side wall portion that is adjacent to a tip end side of the door portion, and wherein the joining member releases joining when pushed by the airbag that inflates, whereby the door portion is pushed open and the protrusion-permitting opening is formed.

10. The knee protection airbag device according to claim 9, wherein the joining member is formed by overlapping an edge at a tip end side of the door portion with an edge of the side wall portion adjacent thereto and thermally welding the edges to each other.

11. The knee protection airbag device according to claim 9, wherein the joining member is formed of a fitting protrusion and a fitting hole for fitting the fitting protrusion that are fitted with each other in a separable manner and that correspond to an edge at a tip end side of the door portion and an edge of the side wall portion adjacent thereto.

12. The knee protection airbag device according to claim 9, wherein the joining member is formed of a tag pin that has a shaft portion penetrating an edge at a tip end side of the door portion and an edge of the side wall portion adjacent thereto in an overlapped state, and locking heads pressing peripheries of the penetrated edges at both ends of the shaft portion, and that joins the edge at a tip end side of the door portion and the edge of the side wall portion adjacent thereto in a separable manner.

13. The knee protection airbag device according to claim 1, wherein in the bent portion formed by bending the portion of the recessed groove for bending, the airbag cover is provided with a bead having a convex shape protruding from an inner side toward an outer side in a direction orthogonal to the recessed groove.

14. The knee protection airbag device according to claim 1, wherein the sheet member has:
 a basis weight in a range of 200 g/m$^2$ to 1500 g/m$^2$; and
 a tensile breaking strength in a range of 100 N/5 cm to 3000 N/5 cm, and wherein the sheet member is made of a non-woven fabric using short fibers.

15. The knee protection airbag device according to claim 14, wherein the sheet member has:
 a basis weight in a range of 400 g/m$^2$ to 800 g/m$^2$; and
 a tensile breaking strength in a range of 300 N/5 cm to 1500 N/5 cm.

\* \* \* \* \*